United States Patent
Ni

(10) Patent No.: US 8,039,922 B2
(45) Date of Patent: Oct. 18, 2011

(54) VARIABLE CAPACITOR EMPLOYING MEMS TECHNOLOGY

(75) Inventor: Wei Ni, Tsukuba (JP)

(73) Assignee: Oki Semiconductor Co., Ltd. (JP)

( * ) Notice: Subject to any disclaimer, the term of this patent is extended or adjusted under 35 U.S.C. 154(b) by 276 days.

(21) Appl. No.: 12/458,845

(22) Filed: Jul. 24, 2009

(65) Prior Publication Data

US 2010/0038753 A1   Feb. 18, 2010

(30) Foreign Application Priority Data

Aug. 13, 2008  (JP) ................. 2008-208584

(51) Int. Cl.
*H01L 29/00* (2006.01)
(52) U.S. Cl. ............... 257/532; 257/595; 257/E29.167; 257/E29.343; 257/E29.344
(58) Field of Classification Search .............. 257/307, 257/532, 595, 602, E29.167, E29.324, E29.325, 257/E29.343, E29.344
See application file for complete search history.

(56) References Cited

U.S. PATENT DOCUMENTS

| | | | | |
|---|---|---|---|---|
| 6,497,141 B1 * | 12/2002 | Turner et al. | ............ | 73/105 |
| 7,075,701 B2 * | 7/2006 | Novotny et al. | ........... | 359/291 |
| 2008/0170742 A1 * | 7/2008 | Trusov et al. | ............ | 381/396 |
| 2009/0320591 A1 * | 12/2009 | Johnson | ............ | 73/504.12 |

FOREIGN PATENT DOCUMENTS

| | | |
|---|---|---|
| JP | 2005-224934 A | 8/2005 |
| JP | 2005-341788 A | 12/2005 |
| JP | 2006-518926 A | 8/2006 |
| JP | 2006-261480 A | 9/2006 |

* cited by examiner

*Primary Examiner* — Matthew E Warren
(74) *Attorney, Agent, or Firm* — Rabin & Berdo, PC

(57) ABSTRACT

When a positive voltage of V1 is applied to a drive capacitor with a braking voltage V2 at 0V, a moveable electrode moves toward the drive electrode, and a capacitance C of a tunable capacitor becomes smaller. When the braking voltage V2 is applied a lower portion brake electrode of the brake capacitor moves in a horizontal direction, such that the inter electrode separation distance between an upper portion brake electrode and the lower portion brake electrode becomes 0 μm. The moveable electrode configured integrally formed with the lower portion brake electrode also moves in the horizontal direction, and the inter electrode separation distance between the moveable electrode and a fixed electrode becomes 0 μm. Since the two electrodes make contact with each other with a dielectric layer interposed therebetween, the position of the moveable electrode can be stably maintained by frictional force between the electrodes.

11 Claims, 42 Drawing Sheets

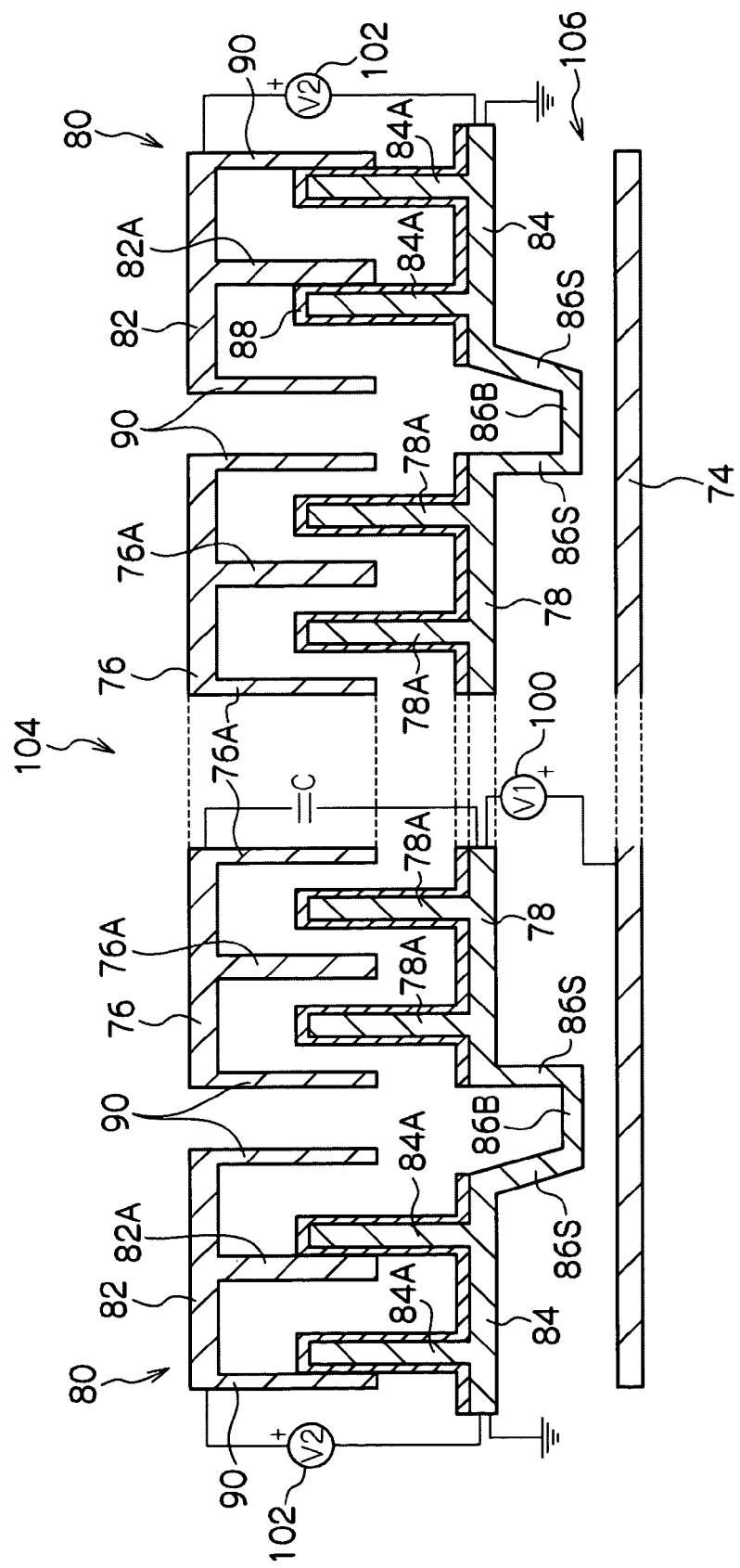

US 8,039,922 B2

VARIABLE CAPACITOR EMPLOYING MEMS TECHNOLOGY

CROSS-REFERENCE TO RELATED APPLICATION

This application is based on and claims priority under 35 USC 119 from Japanese Patent Application No. 2008-208584 filed on Aug. 13, 2008, the disclosure of which is incorporated by reference herein.

BACKGROUND

1. Technical Field

The present invention relates to a variable capacitor, and in particular to a variable capacitor employing MEMS (Micro Electro Mechanical System) technology.

2. Related Art

Recently there has been significant progress in wireless communication equipment, typified by mobile phones. The next generation of mobile phones will use multiple frequency bands. This has lead to progress in the development of multi-frequency receivable RF (Radio Frequency) front ends. The problem with this is the increase in the number of components. In particular it is difficult to make common passive components such as capacitors and inductors, and so the number of components increases along with the increase in the number of frequency bands. As the number of components increases problems arise in that the volume of the RF front end becomes large and there the const becomes expensive.

MEMS technology is drawing attention as a technology to solve such problems, with the ability to make components dramatically more compact. MEMS technology forms microscale mechanical structures, and produces ultra small devices. For example, a MEMS tunable capacitor can be produced capable of having plural impedances in a single device.

A tunable matching circuit can be configured using a MEMS tunable capacitor. By applying such a tunable matching circuit to a RF front end, it becomes possible to automatically reconfigure the circuit itself for each of the frequencies and each system, with the expectation that the number of antennae and number of individual amplifiers can be dramatically reduced. Various MEMS tunable capacitors are therefore proposed.

For example, in Japanese Patent Application Laid-Open (JP-A) No. 2006-261480, a MEMS variable capacitor is described in which a first electrode and a second electrode are disposed fixedly on a substrate, a moveable electrode is moved by an actuator with the application of a voltage, and the electric capacitance between the first electrode and the second electrode is changed by contact with the moveable electrode.

In JP-A No. 2005-224934, a ultra small movable structure (MEMS) is described in which a first electrode and a second electrode are disposed facing each other in an up-down direction. Driving force is generated in this ultra small movable structure by applying a voltage across the first electrode and the second electrode, due to electrostatic force. The surface area over which electrostatic force acts is changed by the second electrode, which is a moveable electrode, moving in the up-down direction, changing the electrostatic capacitance.

However, a battery of about 3V is used in a small scale wireless communication device such as a mobile phone. In order to be applicable to mobile phones or the like, a MEMS tunable capacitor is therefore required capable of low voltage operation with an operating voltage of 3V or less. Namely, the electrostatic capacitance must be capable of being changed by a large amount, within the range of 0V to 3V In cases where comb electrodes are used, like that described in JP-A No. 2005-224934, there is the merit that the surface area over which electrostatic force acts becomes large, and the breadth of change in the electrostatic capacitance can be made large.

In Japanese Patent Application Publication No. 2006-518926, in a similar manner to in JP-A No. 2005-224934, a electromechanical micro variable capacitance diode (MEMS) is described that applies comb electrodes to a fixed electrode and a moveable electrode. In this MEMS variable capacitance diode, the electrostatic capacitance is changed by applying a voltage across the fixed electrode and the moveable electrode, and the moveable electrode moving due to electrostatic force. Comb electrodes are also employed in other MEMS devices, such as in mirror elements and the like. For example, JP-A No. 2005-341788 describes a micro-actuator that moves a movable portion in a substrate base direction by the action of a electrostatic force between a first comb electrode of the substrate base and a second comb electrode of movable portion due to application of a voltage.

As stated above, for application to mobile phones or the like, MEMS tunable capacitors (variable capacitors), using comb electrodes and capable of low voltage operation with an operating voltage of 3V or less, are being researched into. However, a problem arises in that these variable capacitors are not capable of stably maintaining the position of the moveable electrode after movement. The moveable electrode is maintained in a specific position by electrostatic force. The electrostatic capacitance changes if the position of the moveable electrode changes due to external vibration, leading to problems of unstable operation.

The fixed electrode and the moveable electrode operate by comb teeth portions thereof meshing together with each other. Consequently, there is concern of short circuiting occurring if external vibration is imparted during operation and the fixed electrode and the moveable electrode make contact with each other.

SUMMARY

The present invention addresses the above problems to be addressed, and a objective thereof is to provide a variable capacitor of a structure resistant to external vibrations, a variable capacitor that can maintain the position of a moveable electrode after movement thereof, and can stably operate at the desired electrostatic capacitance.

A first aspect of the present invention is a variable capacitor including: a support substrate; a first electrode formed as a thin film on a surface of the support substrate; a flat plate shaped second electrode provided in a fixed position above the first electrode and provided with plural comb teeth portions projecting out toward the first electrode; a flat plate shaped third electrode disposed between the first electrode and the second electrode, the third electrode retained so as to be movable with respect to the second electrode in a vertical direction and a horizontal direction, provided with plural comb teeth portions facing toward spaces between the plural comb teeth portions of the second electrode and projecting out toward the second electrode, the surface of the third electrode covered in a dielectric layer, wherein a variable capacitor is configured by the third electrode and the second electrode, and the third electrode moves in a vertical direction according to a first voltage applied between the first electrode and the second electrode; a flat plate shaped fourth electrode disposed in a fixed position above the first electrode, the fourth electrode being connected in the horizontal direction to the second electrode, provided with plural comb teeth portions projecting out toward the first electrode, and being electrically insulated from the second electrode; a flat plate shaped fifth electrode disposed between the first electrode and the fourth electrode, the fifth electrode being connected in a horizontal direction to the third electrode and provided with at least one comb tooth portion facing toward a space between the plural comb teeth portions of the fourth electrode and projecting out toward the fourth electrode, the surface of the fifth electrode being covered in a dielectric layer, the fifth electrode configuring with the fourth electrode a vibration prevention portion that prevents vibration of the third electrode, the fifth electrode moving in a horizontal direction according to a second voltage applied between the fourth electrode and the fifth electrode with the comb teeth portions of the fourth electrode and the comb teeth portion(s) of the fifth electrode making contact and fixing the fifth electrode to the fourth electrode due to frictional force.

A second aspect of the present invention is a variable capacitor including: a support substrate; a first electrode formed as a thin film on a surface of the support substrate; a flat plate shaped second electrode provided in a fixed position above the first electrode and provided with plural comb teeth portions projecting out toward the first electrode; a flat plate shaped third electrode disposed between the first electrode and the second electrode, the third electrode retained so as to be movable with respect to the second electrode in a vertical direction and a horizontal direction, provided with plural comb teeth portions facing toward spaces between the plural comb teeth portions of the second electrode and projecting out toward the second electrode, with the surface of the third electrode covered in a dielectric layer, wherein a variable capacitor is configured by the third electrode and the second electrode, and the third electrode moves in a vertical direction according to a first voltage applied between the first electrode and the second electrode; plural pairs of flat plate shaped fourth electrodes disposed in a fixed position above the first electrode, connected in the horizontal direction to the second electrode so as to be left-right symmetrical with respect to the second electrode, provided with plural comb teeth portions projecting out toward the first electrode, and electrically insulated from the second electrode; plural flat plate shaped fifth electrodes, provided so as correspond to each of the plural pairs of fourth electrodes, disposed between the first electrode and the fourth electrodes, connected to the third electrode in a horizontal direction, and each provided with at least one comb tooth portion facing toward a space between the plural comb teeth portions of the respective fourth electrode and projecting out toward the fourth electrode, the surface of the fifth electrodes covered in a dielectric layer, the fifth electrodes configuring with each of the respective plural pairs of fourth a vibration prevention portion that prevents vibration of the third electrode, each of the respective fifth electrodes in a pair moving in opposite horizontal directions according to a second voltage applied between the fourth electrodes and the fifth electrodes, with the comb teeth portions of the fourth electrodes and the comb teeth portions of the fifth electrodes making contact and fixing the fifth electrodes to the respective of the plural pairs of fourth electrodes due to frictional force.

BRIEF DESCRIPTION OF THE DRAWINGS

Exemplary embodiments of the present invention will be described in detail based on the following figures, wherein:

FIG. 24 is an diagram for explaining a vibration prevention operation of a variable capacitor;

DETAILED DESCRIPTION

A detailed explanation will now be given of an exemplary embodiment of the present invention, with reference to the drawings.

First Exemplary Embodiment

Outline Configuration of Variable Capacitor

Figure 1:
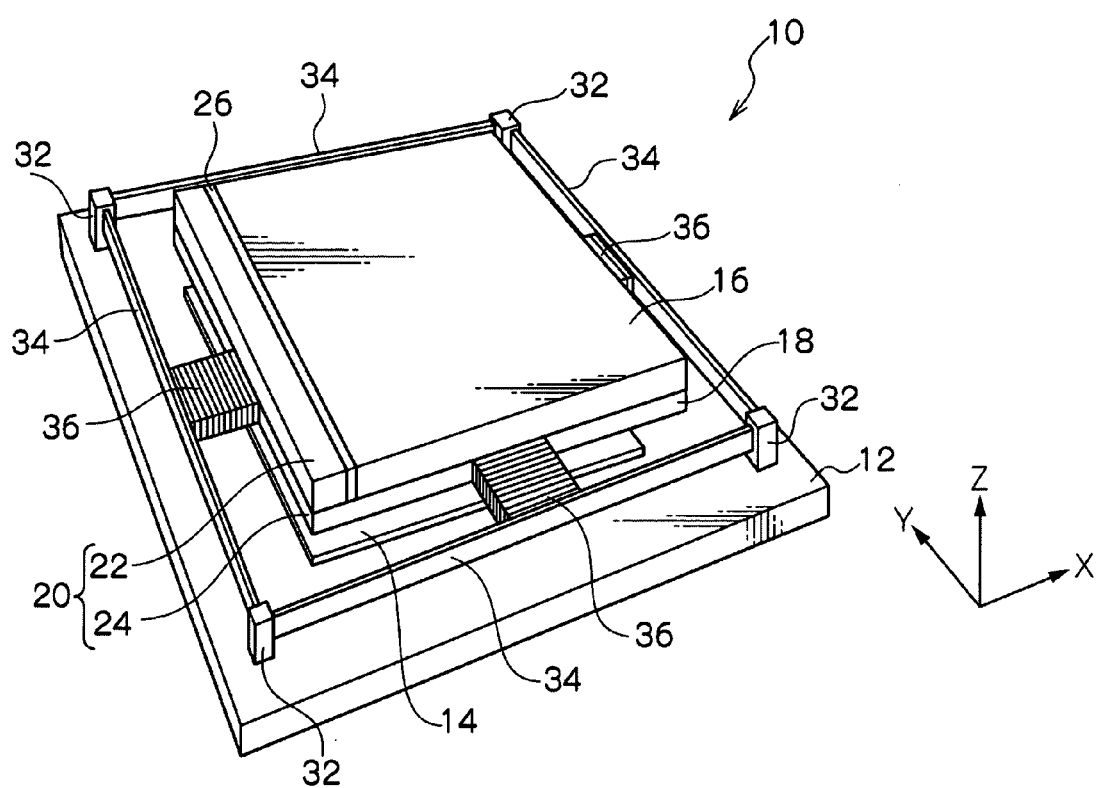
FIG. 1 is a perspective view showing the external appearance of a variable capacitor according to a first exemplary embodiment of the present invention.
Figure 2:
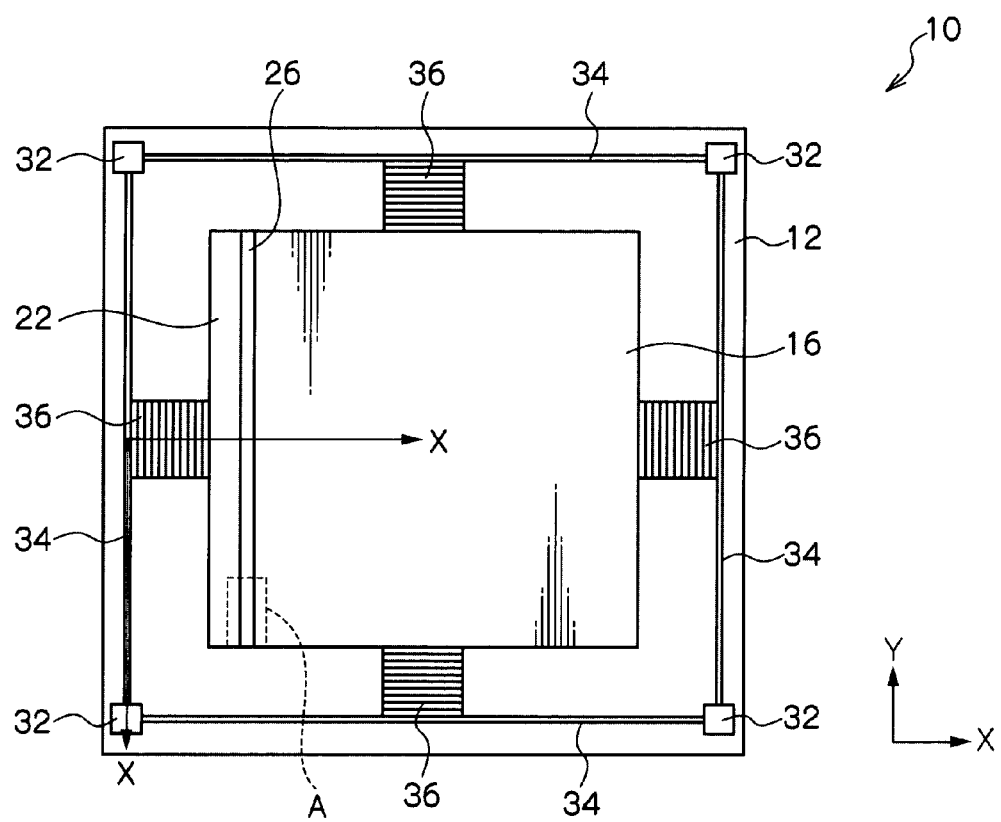
FIG. 2 is a plan view of a variable capacitor, as seen from a fixed electrode.
Figure 3:
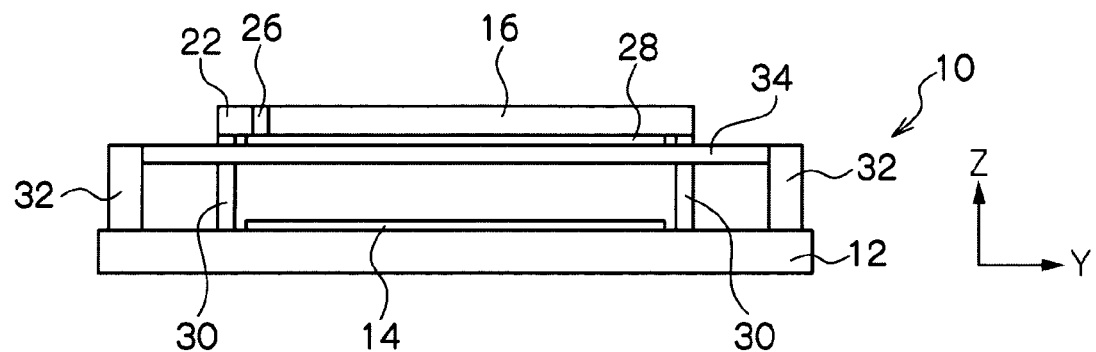
FIG. 3 is a side view of a variable capacitor.

First, a simple explanation will be given of a configuration of a variable capacitor, with reference to FIG. 1 to FIG. 3. FIG. 1 is a perspective view showing the external appearance of a variable capacitor according to a first exemplary embodiment of the present invention. FIG. 2 is a plan view of a variable capacitor, as seen from the fixed electrode. FIG. 3 is a side view of a variable capacitor.

A variable capacitor 10 is equipped with: a support substrate 12 configured from a semiconductor such as silicon or the like; a drive electrode 14 disposed on the support substrate 12; a fixed electrode 16 disposed so as to face the drive electrode 14 with a separation therebetween; a movable electrode 18, disposed retained moveably between the drive electrode 14 and the fixed electrode 16; and a brake capacitor 20, serving as a vibration prevention portion for preventing vibration after movement of the movable electrode 18. The brake capacitor 20 is configured with an upper portion brake electrode 22 and a lower portion brake electrode 24 that makes contact with the upper portion brake electrode 22 on application of a voltage.

The support substrate 12 is a flat plate of rectangular shape in plan view. Any substrate applicable to semiconductor processes may be used as the support substrate 12, and other than semiconductor substrates such as silicon substrate and the like, crystalline substrates such as of aluminum oxide ($Al_2O_3$) can be used. The drive electrode 14 is a thin electrode made from an electrically-conductive material. Materials that are generally used in semiconductor processes can be used as such an electrically-conductive material. The drive electrode 14 is formed as a film on the support substrate 12 with an insulating layer (not illustrated) interposed therebetween. The drive electrode 14 is of a rectangular shape in plan view that is slightly smaller than the support substrate 12, and is formed on the middle of the support substrate 12.

In the present exemplary embodiment, the surface area of the support substrate 12 is set at 400 μm×400 μm and the surface area of the drive electrode 14 is set at 300 μm×300 μm. A semiconductor substrate of silicon (Si) or the like is employed for the support substrate 12. Tungsten silicide ($WSi_2$) is employed for the electrically-conductive material used for the drive electrode 14. Silicon nitride ($Si_3N_4$) is employed for the insulating layer (not illustrated). The thickness of the drive electrode 14 is about 0.2 μm.

The fixed electrode 16 is equipped with a substrate of rectangular shape in plan view. This substrate, as will be explained later, is provided with plural comb teeth portions 16A that project out from the substrate toward the support substrate 12 (see FIG. 4). The upper portion brake electrode 22 is equipped with a substrate that is a long thin strip shape in plan view. This substrate, as will be explained later, is provided with a single or plural comb teeth portions 22A that project out from the substrate toward the support substrate 12 (see FIG. 4). The substrate side face in the length direction of the upper portion brake electrode 22 is joined to the substrate side face in the length direction of the fixed electrode 16, with a dielectric member 26 interposed therebetween. Namely, the fixed electrode 16, the dielectric member 26, and the upper portion brake electrode 22 are integrally formed as a member having a rectangular shape in plan view. The surface area of the fixed electrode 16, to which the upper portion brake electrode 22 is attached, is about the same size as the surface area of the facing drive electrode 14. The fixed electrode 16 and the upper portion brake electrode 22 can be formed from the same electrically-conductive material. Materials that are generally used in semiconductor processes can be used as such an electrically-conductive material.

In the present exemplary embodiment, the surface area of the fixed electrode 16, to which the upper portion brake electrode 22 is attached, is set at 300 μm×300 μm. The thickness of the fixed electrode 16 and the upper portion brake electrode 22 is about 1.4 μm. The thickness of the substrate is about 0.2 μm, the height of the comb teeth portions is about 1.2 μm, giving a total thickness of about 1.4 μm. Poly-crystalline silicon (Poly-Si) is employed as the electrically-conductive material for the fixed electrode 16 and the upper portion brake electrode 22. Silicon nitride ($Si_3N_4$) is employed for the dielectric member 26.

The movable electrode 18 and the lower portion brake electrode 24 are integrally formed as a member of rectangular shape in plan view from an electrically-conductive material. Materials that are generally used in semiconductor processes can be used as such an electrically-conductive material. The fixed electrode 16 and the movable electrode 18 are preferably formed from the same material. The portion of this member that faces the fixed electrode 16 is the movable electrode 18, and the portion thereof that faces the upper portion brake electrode 22 is the lower portion brake electrode 24. This member is equipped with a substrate that is of a rectangular shape in plan view. This substrate, as will be explained later, is provided with plural comb teeth portions 18A that project out from the substrate toward the fixed electrode 16, and a single or plural comb teeth portions 24A are provided that project out from the substrate toward the upper portion brake electrode 22 side (see FIG. 4). The surfaces of the movable electrode 18 and the lower portion brake electrode 24 that are formed with the comb teeth portions are covered with a dielectric layer 28. The surface area of the movable electrode 18, to which the lower portion brake electrode 24 is attached, is about the same size as the surface area of the facing drive electrode 14.

In the present exemplary embodiment, the surface area of the movable electrode 18, to which the lower portion brake electrode 24 is attached, is set as 300 μm×300 μm. The thickness of the movable electrode 18 and the lower portion brake electrode 24 is about 1.4 μm. The thickness of the substrate is about 0.2 μm, the height of the comb teeth portions about 1.2 μm, giving a total thickness of about 1.4 μm. The thickness of the dielectric layer 28 is about 0.1 μm. Poly-crystalline silicon (Poly-Si) is employed as the electrically-conductive material used in the movable electrode 18 and the lower portion brake electrode 24. Silicon nitride ($Si_3N_4$) is employed for the dielectric layer 28.

The fixed electrode 16, to which the upper portion brake electrode 22 is attached, is supported by plural support columns 30 provided extending upright from the support substrate 12, and the fixed electrode 16 is disposed fixed at a specific height from the support substrate 12. The number of support columns 30 is preferably 3 or more. The plural support columns 30 can be formed from the same electrically-conductive materials as the fixed electrode 16. In the present exemplary embodiment, poly-crystalline silicon (Poly-Si) is employed as the electrically-conductive material used for the support columns 30. The fixed electrode 16 is disposed at a height of about 5 µm from the support substrate 12.

Anchor portions 32 of column shape are provided extending upright from each of the four corners of the support substrate 12. Namely, four anchor portions 32 extend upright from the support substrate 12. Beam portions 34 of elongated shape span across between the four anchor portions 32. The elongated shaped beam portions 34 span across so as to surround the movable electrode 18 etc. In the present exemplary embodiment, elongated shaped beam portions 34 of 1.4 µm width span across at a height of about 3.5 µm from the support substrate 12.

The movable electrode 18, to which the lower portion brake electrode 24 is attached, is connected to the beam portions 34 by plural spring members 36. By being connected to the beam portions 34 by the spring members 36, the movable electrode 18, to which the lower portion brake electrode 24 is attached, is retained between the drive electrode 14 and the fixed electrode 16, so as to be movable in a vertical direction and in a horizontal direction.

In the present exemplary embodiment, the lower portion brake electrode 24 and the movable electrode 18 are retained by the four spring members 36 at the same height as the elongated shaped beam portions 34 (namely at a height of about 3.5 µm from the support substrate 12). The anchor portions 32, the beam portions 34, and the spring members 36 can be formed from the same electrically-conductive materials as the retained movable electrode 18. In the present exemplary embodiment, poly-crystalline silicon (Poly-Si) is employed as the electrically-conductive material used for the anchor portions 32, beam portions 34, and spring members 36.

It should be noted that in-plane directions parallel to the support substrate 12 are referred to as horizontal directions, and perpendicular directions to the support substrate 12 are referred to as vertical directions. Of the in-plane directions, the direction in which one side of the rectangular shaped support substrate 12 extends is referred to as the X direction, and the direction orthogonal thereto is referred to as the Y direction. The direction orthogonal to the X direction and the Y direction respectively is referred to as the Z direction. In the perspective view shown in FIG. 1, dimensions in the Z direction have been shown enlarged 30 times. In the side view shown in FIG. 3, a schematic representation is shown with the movable electrode 18 behind the beam portions 34, and the dielectric layer 28 present between the fixed electrode 16 and the movable electrode 18.

Structure of Comb Electrodes

Figure 4:
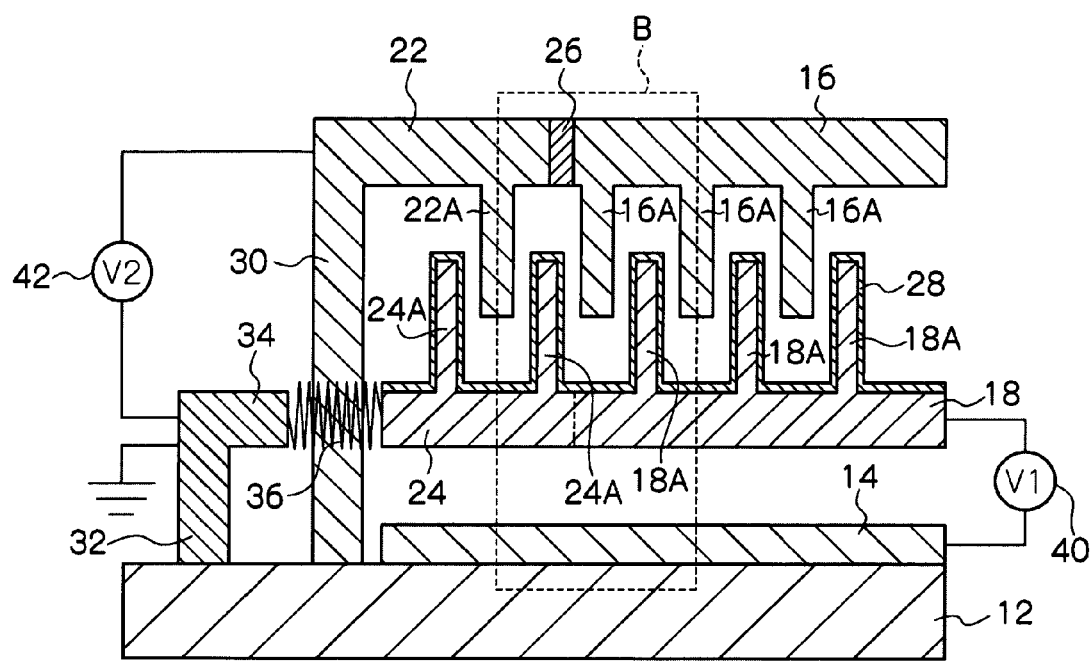
FIG. 4 is a cross-section of the variable capacitor shown in FIG. 2, taken on line X-X.
Figure 5A:
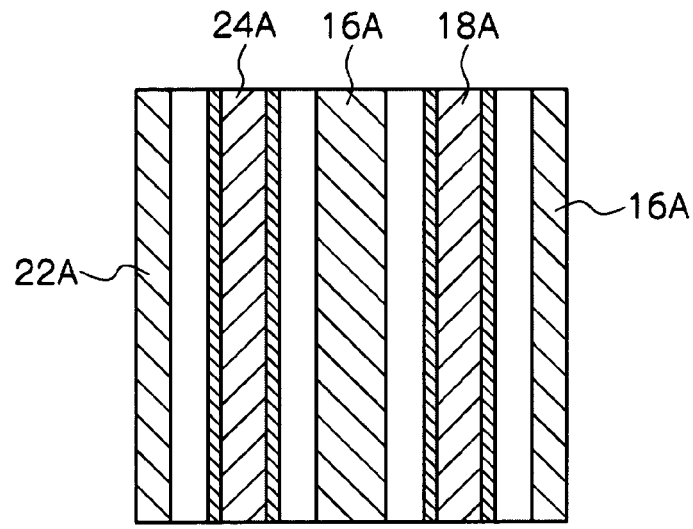
FIG. 5A is a diagram showing a region A shown in FIG. 2, with comb teeth portions in a fitted together state.
Figure 5B:
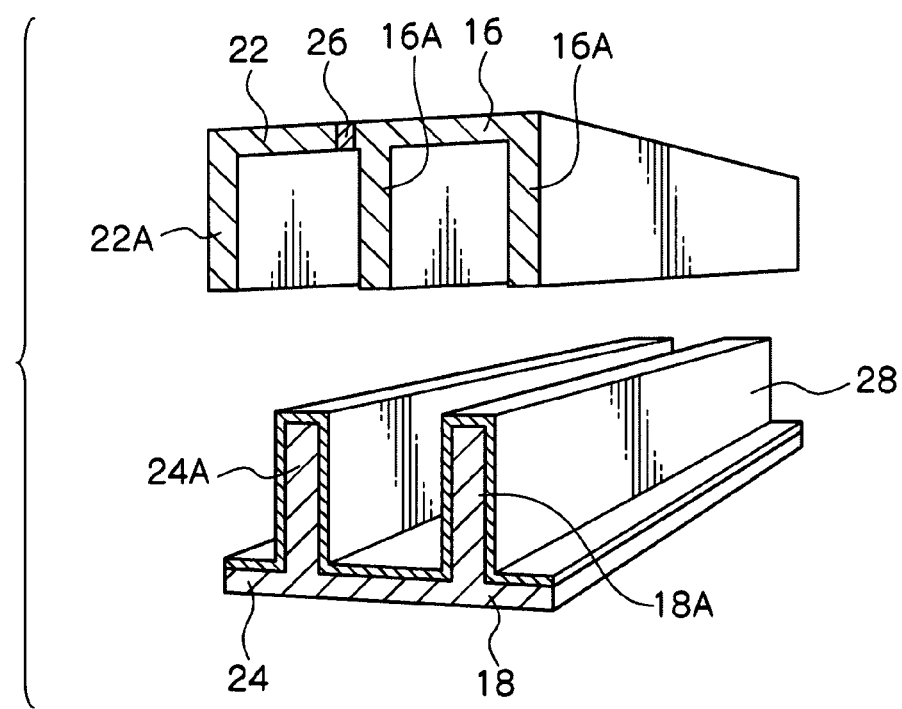
FIG. 5B is an exploded perspective view of facing electrodes in the region A shown in FIG. 2.

Explanation will now be given of the structure of the comb electrodes, with reference to FIG. 4 and FIGS. 5A and 5B. FIG. 4 is a cross-section of the variable capacitor shown in FIG. 2, taken on line X-X. FIG. 5A is a diagram showing a fitted-together state of comb teeth portions of the region A of FIG. 2. The region A of FIG. 2 is a small region of about 3 µm×about 10 µm in the vicinity of the dielectric body 26, and is equivalent to region B of FIG. 4. FIG. 5B is an exploded perspective view of facing electrodes of region A shown in FIG. 2.

As shown in FIG. 4, plural comb teeth portions 16A are provided to the fixed electrode 16. A single or plural comb teeth portions 22A are provided to the upper portion brake electrode 22. FIG. 4 is a diagram showing three individual comb teeth portions 16A and one individual comb teeth portion 22A. Plural comb teeth portions 18A are also provided to the movable electrode 18. A single or plural comb teeth portions 24A are provided to the lower portion brake electrode 24. FIG. 4 shows three individual comb teeth portions 18A and two individual comb teeth portions 24A.

As shown in FIG. 5B, when shown in three-dimensional structure, each of the comb teeth portions is a plate body that is an elongated shape extending parallel to the length direction of the dielectric member 26 (in FIG. 2 the Y direction). For example, taking the comb teeth portions 18A of the movable electrode 18, the comb teeth portions 18A that are plate bodies of elongated shape, are provided to a substrate of the movable electrode 18 so as to extend parallel to the Y direction and at right angles to the substrate. In the present exemplary embodiment, each of the comb teeth portions 16A, the comb teeth portions 18A, the comb teeth portion 22A, and the comb teeth portions 24A project out from the substrate with a height of 1.2 µm and a width of 0.5 µm. The separation distance between two adjacent individual comb teeth portions on the same substrate is about 0.9 µm.

As shown in FIG. 4 and FIG. 5A, in the initial state before application of voltage between electrodes, the movable electrode 18, to which the lower portion brake electrode 24 is attached, is retained at a specific position such that the comb teeth portions 18A and the comb teeth portions 24A of the movable electrode 18-side, each face toward spaces between the comb teeth portions 16A and the comb teeth portion 22A of the fixed electrode 16-side (regions in which there are no comb teeth portions provided).

Due to this configuration, even if the movable electrode 18 moves in the vertical direction toward the fixed electrode 16, the comb teeth portions 18A of the movable electrode 18 can intrude into the spaces between adjacent two comb teeth portions 16A on the fixed electrode 16-side. The comb teeth portions 24A of the lower portion brake electrode 24 can also intrude into the spaces between the comb teeth portion 22A and the comb teeth portion 16A on the fixed electrode 16-side. In the present exemplary embodiment, for example, when the comb teeth portions 16A and the comb teeth portions 18A are such that the comb teeth portions of the facing electrodes are in the fitted together state, the distance between the facing comb teeth portions is set to about 0.1 µm.

As described above, the surfaces of the movable electrode 18 and the lower portion brake electrode 24 that are formed with the comb teeth portions are covered by the dielectric layer 28. Consequently, the dielectric layer 28 is always present interposed between the movable electrode 18 and the fixed electrode 16, and short circuiting does not occur between the two electrodes due to movement of the movable electrode 18. In a similar manner, the dielectric layer 28 is always present interposed between the upper portion brake electrode 22, and the lower portion brake electrode 24, and short circuiting does not occur between the two electrodes due to movement of the lower portion brake electrode 24.

The drive electrode 14 and the movable electrode 18 are connected to a power source 40 that applies a driving voltage V1 between the two electrodes. The upper portion brake electrode 22 and the lower portion brake electrode 24 are also connected to a power source 42 that applies a braking voltage V2 between the two electrodes. It should be noted that the lower portion brake electrode 24 and the movable electrode 18 are connected to the power source 42 via the spring members 36, the beam portions 34, and the anchor portions 32, and are also earthed. Consequently, the lower portion brake electrode 24 and the movable electrode 18 are earthed and at a ground electrical potential.

Figure 6:
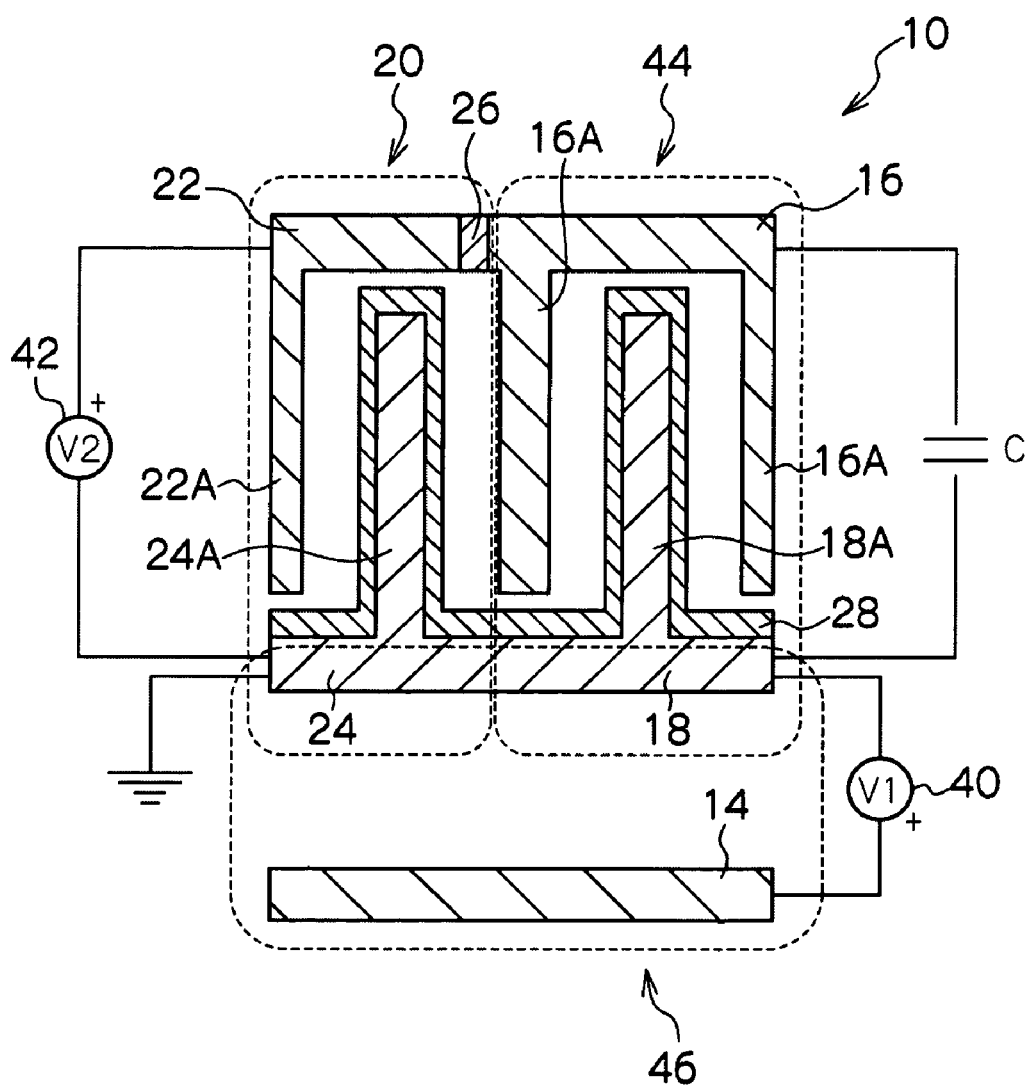
FIG. 6 is an enlarged view of the region B shown in FIG. 4.
Figure 7A:
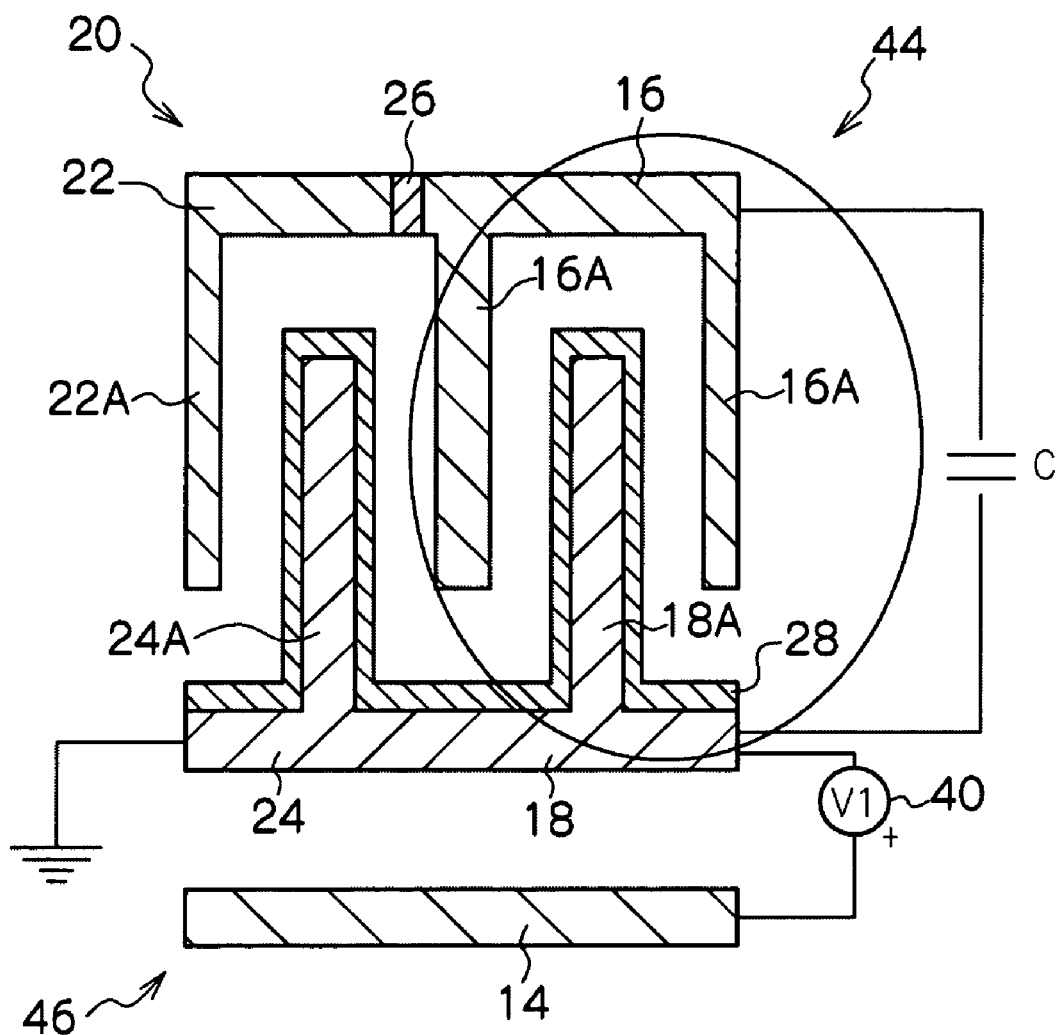
FIG. 7A is a diagram for explaining the capacitance adjusting operation of a variable capacitor.
Figure 7B:
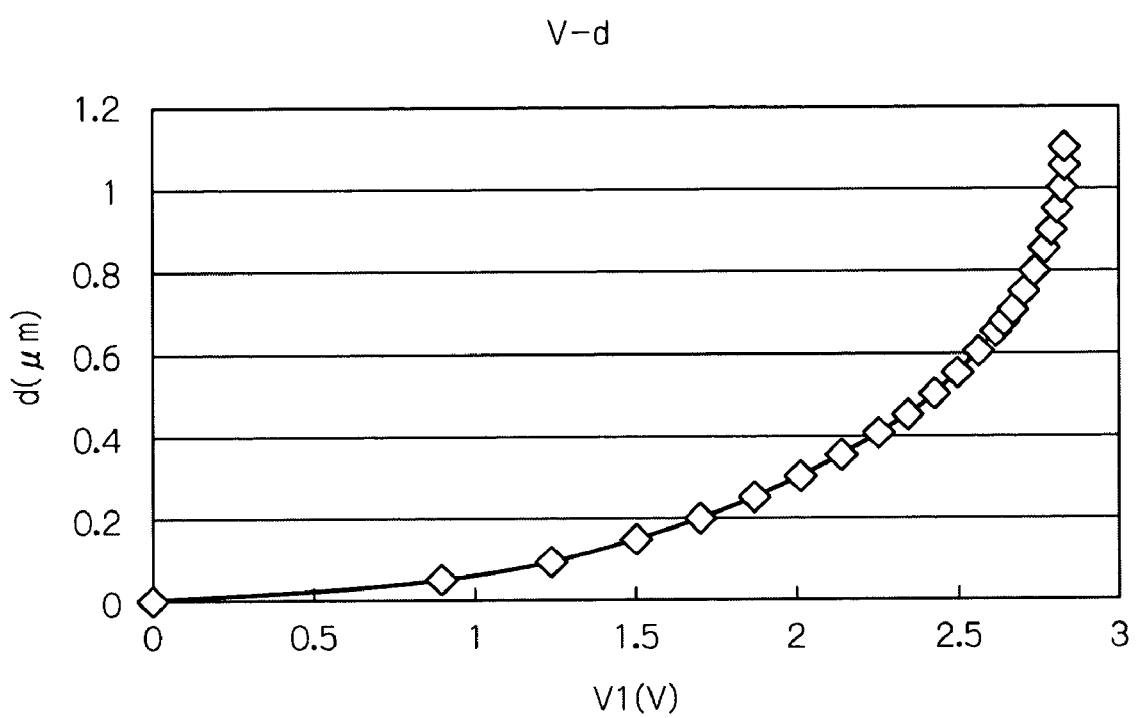
FIG. 7B is a graph showing the voltage dependency of a tunable capacitor.
Figure 8A:
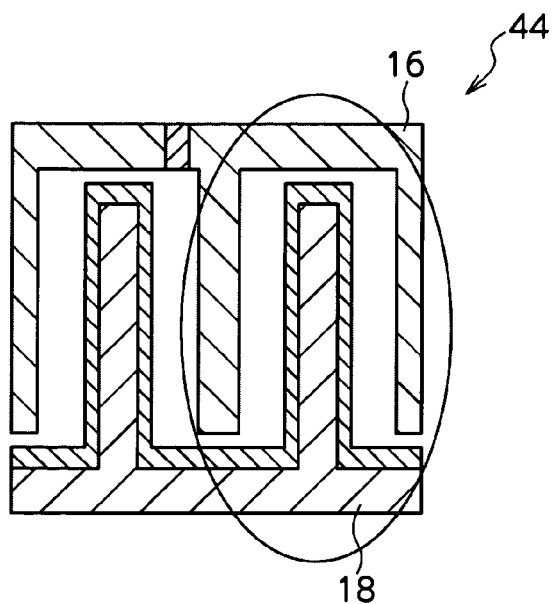
FIGS. 8A and 8B are cross-sectional views showing the manner of operation of a tunable capacitor.
Figure 8B:
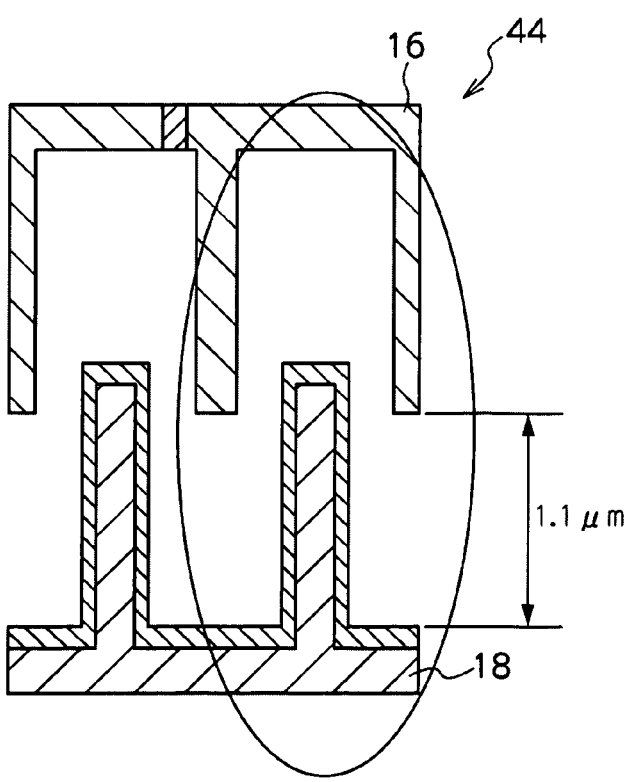
Figure 9A:
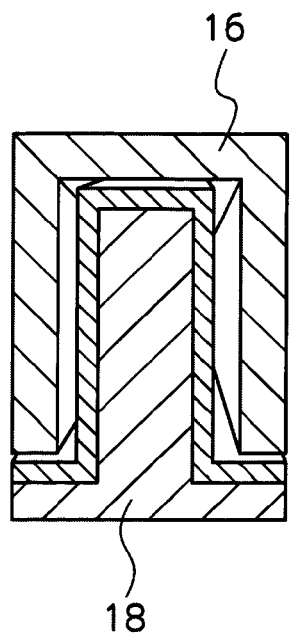
FIGS. 9A and 9B are three dimensional figures showing the manner of operation of the tunable capacitor.
Figure 9B:
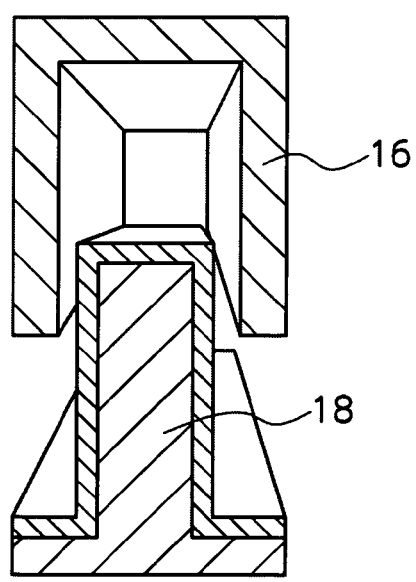

Operation of Variable Capacitor (1) Capacitance Adjusting Operation of the Variable Capacitor First explanation will be given of the capacitance adjusting operation of the variable capacitor, with reference to FIG. 6 to FIG. 9. FIG. 6 is an enlarged view of the region B shown in FIG. 4. FIG. 7A is a diagram for explaining the capacitance adjusting operation of the variable capacitor. FIG. 7B is a graph showing the voltage dependency of a tunable capacitor. FIGS. 8A and 8B are cross-sections showing the manner of operation of the tunable capacitor, and FIGS. 9A and 9B are three dimensional figures showing the manner of operation of the tunable capacitor.

As shown in FIG. 6, the variable capacitor 10 is configured, from the functional perspective, by three types of capacitor: the brake capacitor 20 serving as a vibration prevention portion; a tunable capacitor 44 serving as a variable capacitor; and a drive capacitor 46 serving as an electrode drive portion. The brake capacitor 20 is configured by the upper portion brake electrode 22 and the lower portion brake electrode 24. The tunable capacitor 44 is configured by the fixed electrode 16 and the movable electrode 18. The drive capacitor 46 is configured from the fixed electrode 16, and the movable electrode 18 and the lower portion brake electrode 24. The capacitance of the tunable capacitor 44 will be referred to as "C".

As shown in FIG. 7A, to execute capacitance adjusting operation, a positive voltage of V1 is applied to the drive capacitor 46 with the braking voltage V2 at 0V. The driving voltage V1 is applied from the power source 40 to between the drive electrode 14 and the movable electrode 18. The inter electrode separation distance in the vertical direction of the drive capacitor 46 thereby reduces, with the movable electrode 18 moving toward the drive electrode 14. The facing electrode surface area of the tunable capacitor 44, surrounded by a dashed line in the diagram, reduces, and the facing separation distance of the fixed electrode 16 and the movable electrode 18 increases. The capacitance C of the tunable capacitor 44 thereby becomes smaller.

As shown in FIG. 7B, the inter electrode separation distance d of the tunable capacitor 44 changes depending on the driving voltage V1. In the figure the horizontal axis is the driving voltage V1 (in V), and the vertical axis is the inter electrode separation distance d (in μm) between the fixed electrode 16 and the movable electrode 18. As can be seen from the figure, the inter electrode separation distance d in the vertical direction increases from 0 μm to 1.2 μm accompanying an increase from 0V to 3V in the driving voltage V1.

It should be noted that the relationship between the driving voltage V1 and the inter electrode separation distance d is determined according to Equation (5) below that is derived from equations (1) to (4) below.

"U" is the energy between the movable electrode 18 and the drive electrode 14, and is represented by Equation (1) below.

$$U = \frac{CV^2}{2} = \frac{SK\varepsilon V^2}{2(d_0 - d)} \quad \text{Equation (1)}$$

"F" is the electrostatic force between the movable electrode 18 and the drive electrode 14, and is represented by Equation (2) below.

$$F = \frac{\partial U}{\partial (d_0 - d)} = \frac{SK\varepsilon V^2}{2(d_0 - d)^2} \quad \text{Equation (2)}$$

"k" is the spring constant of the beam portions 34 and the spring members 36, and is represented by Equation (3) below. The value of constant k can be suitably designed according to the shape and length of the beam portions 34 and the spring members 36. In this case k=0.6 N/m.

$$k = \frac{F}{d} \geq F = kd \quad \text{Equation (3)}$$

Equation (4) below is derived from Equation (2) and Equation (3) above.

$$kd = \frac{SK\varepsilon V^2}{2(d_0 - d)^2} \quad \text{Equation (4)}$$

Based on Equation (1) to Equation (4) above, the relationship between the driving voltage V1 and the inter electrode separation distance d is represented in Equation (5) below.

$$V_1 = \sqrt{\frac{2kd(d_0 - d)^2}{SK\varepsilon}} \quad \text{Equation (5)}$$

Note that in the above Equation (1) to Equation (5), "d" is the displacement of the movable electrode 18, namely the inter electrode separation distance of the fixed electrode 16 and the movable electrode 18. "$d_0$" is the inter electrode separation distance between the movable electrode 18 and the drive electrode 14 when V1=0V, and in this case $d_0$=3.3 μm. "S" is the surface area of the movable electrode 18, which in this case is 300 μm×300 μm. "$\varepsilon$" is the electric permittivity of a vacuum, and $\varepsilon$=8.85E-12 F/m. "K" is the relative permittivity of a vacuum, and is 1 in this case. "length, thickness, distance" of other named components in the present exemplary embodiment are as defined above.

As can be seen from Equation (5) above, when the driving voltage V1 is 0V the inter electrode separation distance d is about 0 μm, as shown in FIG. 8A and FIG. 9A. The capacitance C is 20.7 pF in this state. When, however, the driving voltage V1 is 2.83V, the inter electrode separation distance d is about 1.1 μm, as shown in FIG. 8B and FIG. 9B. The capacitance C is 5.9 pF in this state. The size of the capacitance C of the tunable capacitor 44 can be adjusted by operation in a manner such as this. Note that the values of capacitance C are values obtained by simulation.

(2) Vibration Prevention Operation of Variable Capacitor

Explanation will now be given of vibration prevention operation of the variable capacitor, with reference to FIG. 10 and FIG. 11. FIGS. 10A to 10C are figures showing the way in which the brake capacitor prevents vibration of the movable electrode. FIGS. 11A to 11C are figures showing graphs of the characteristics of a tunable capacitor during operation of the brake capacitor.

As stated above, when a positive voltage of V1 is applied to the drive capacitor 46 with the braking voltage V2 at 0V, the movable electrode 18 moves toward the drive electrode 14, and the capacitance C of the tunable capacitor 44 becomes smaller (see FIG. 6 and FIG. 7). As shown in FIG. 7, the movable electrode 18 is retained in a specific position by electrostatic force, and if this state remains as it is, there is a concern that the movable electrode 18 would vibrate when imparted with external vibration. In order to prevent such vibration, the braking voltage V2 is applied between the upper portion brake electrode 22 and the lower portion brake electrode 24, from the power source 42.

Figure 10A:
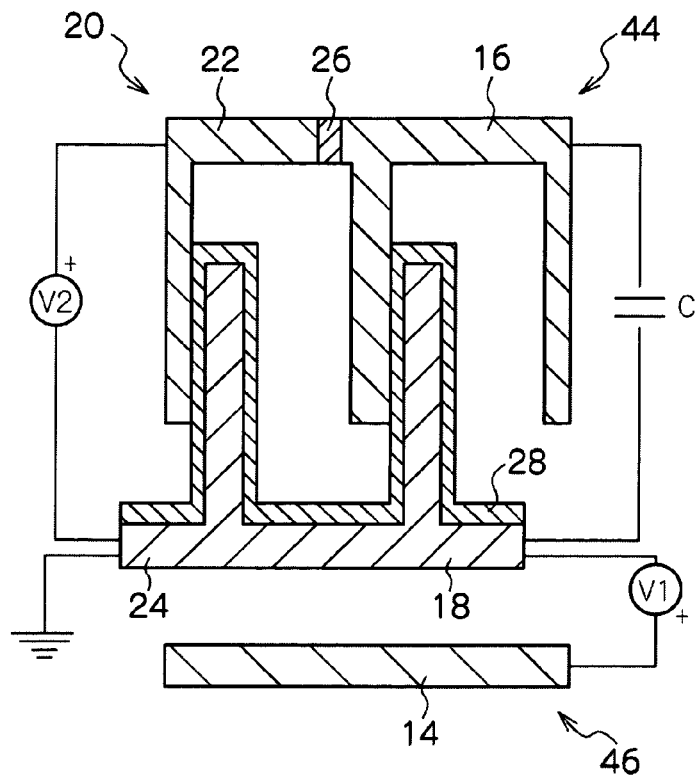
FIGS. 10A to 10C are figures showing the way in which a brake capacitor prevents vibration of a movable electrode.

As shown in FIG. 10A, when the braking voltage V2 is applied, the lower portion brake electrode 24 of the brake capacitor 20 moves in a horizontal direction, with the inter electrode separation distance of the upper portion brake electrode 22 and the lower portion brake electrode 24 in the horizontal direction becoming 0 μm. The movable electrode 18 that is integrally formed with the lower portion brake electrode 24 also moves in the horizontal direction, and the inter electrode separation distance of the movable electrode 18 and the fixed electrode 16 in the horizontal direction also becomes 0 μm. Namely, each of the facing electrodes make contact with each other with the dielectric layer 28 interposed therebetween.

It is thereby possible to make the movable electrode 18 and the fixed electrode 16 contact over a large surface area, and the movable electrode 18 can be stably maintained in a specific position by frictional force between the electrodes. There is also a larger variable amount in the capacitance C of the tunable capacitor 44.

Figure 10B:
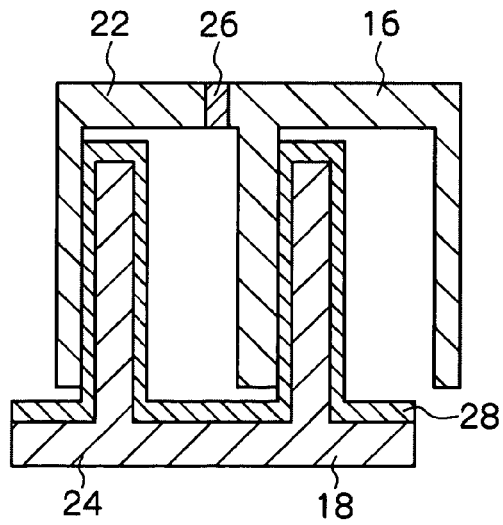

For example, when a braking voltage V2 of 3V is applied with the driving voltage V1 at 0V and the inter electrode separation distance d at about 0 μm, as shown in FIG. 8A, then, as shown in FIG. 10B, the lower portion brake electrode 24 and the movable electrode 18 move in the horizontal direction while maintaining position in the vertical direction, and the facing electrodes make contact with each other with the dielectric layer 28 interposed therebetween, fixing in position due to frictional force.

Figure 10C:
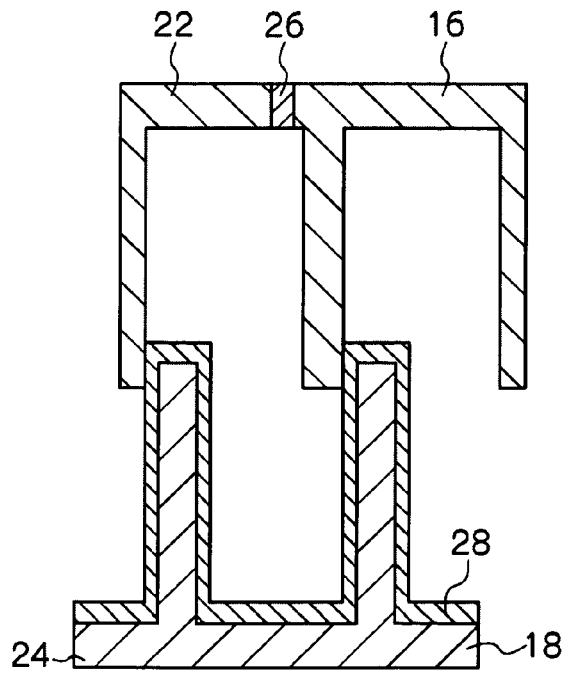

In a similar manner, when a braking voltage V2 of 3V is applied with the driving voltage V1 at 2.83V and the inter electrode separation distance d at about 1.1 μm, as shown in FIG. 8B, then, as shown in FIG. 10C, the lower portion brake electrode 24 and the movable electrode 18 move in the horizontal direction while maintaining position in the vertical direction, and facing electrodes make contact with each other with the dielectric layer 28 interposed therebetween, fixing in position due to frictional force.

Figure 11A:
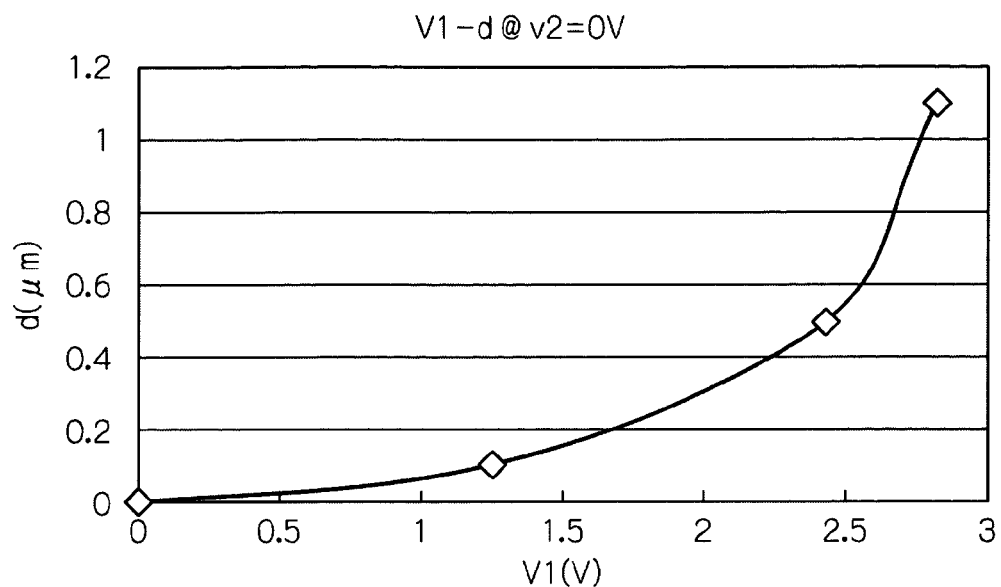
FIGS. 11A to 11C are figures showing graphs of the characteristics of a tunable capacitor during operation of a brake capacitor.

As shown in FIG. 11A, the inter electrode separation distance d of the tunable capacitor 44 changes depending on the driving voltage V1. In the figure the horizontal axis is the driving voltage V1 (in V), and the vertical axis is the inter electrode separation distance d (in μm) between the fixed electrode 16 and the movable electrode 18. As can be seen from the figure, the inter electrode separation distance d in the vertical direction increases from 0 μm to 1.2 μm accompanying an increase from 0V to 3V in the driving voltage V1.

Figure 11B:
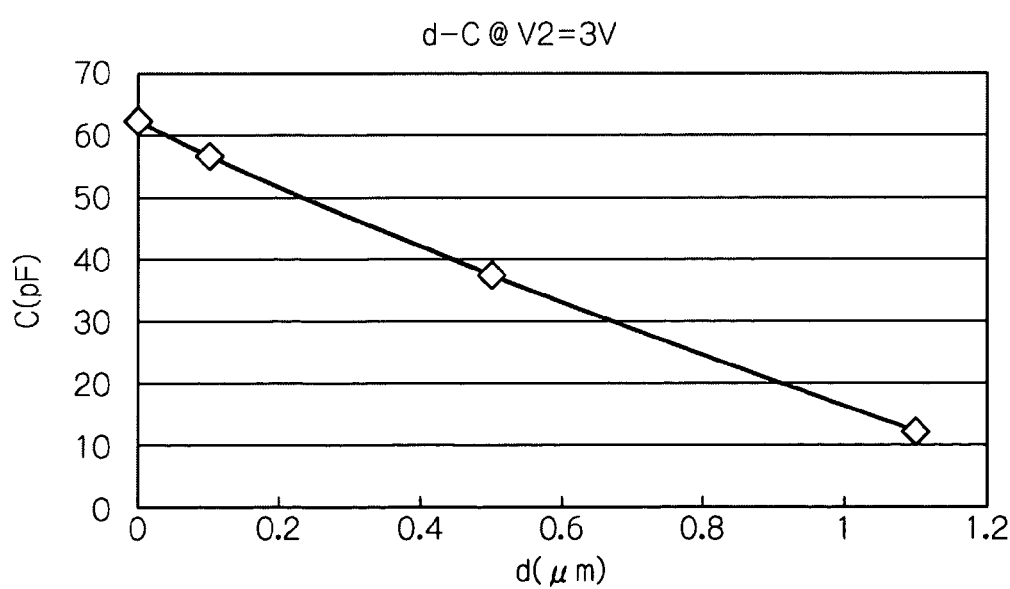

Furthermore, as shown in FIG. 11B, when the braking voltage V2 is applied with varying inter electrode separation distances d according to the driving voltage V1, the capacitance C of the tunable capacitor 44 changes depending on the inter electrode separation distance d. In the figure the horizontal axis is the inter electrode separation distance d (in μm), and the vertical axis is the capacitance C (in pF). As can be seen from the figure, when a braking voltage V2 of 3V is applied, the capacitance C decreases from about 60 pF to about 10 pF accompanying the increase in the inter electrode separation distance d from 0 μm to 1.2 μm.

Figure 11C:
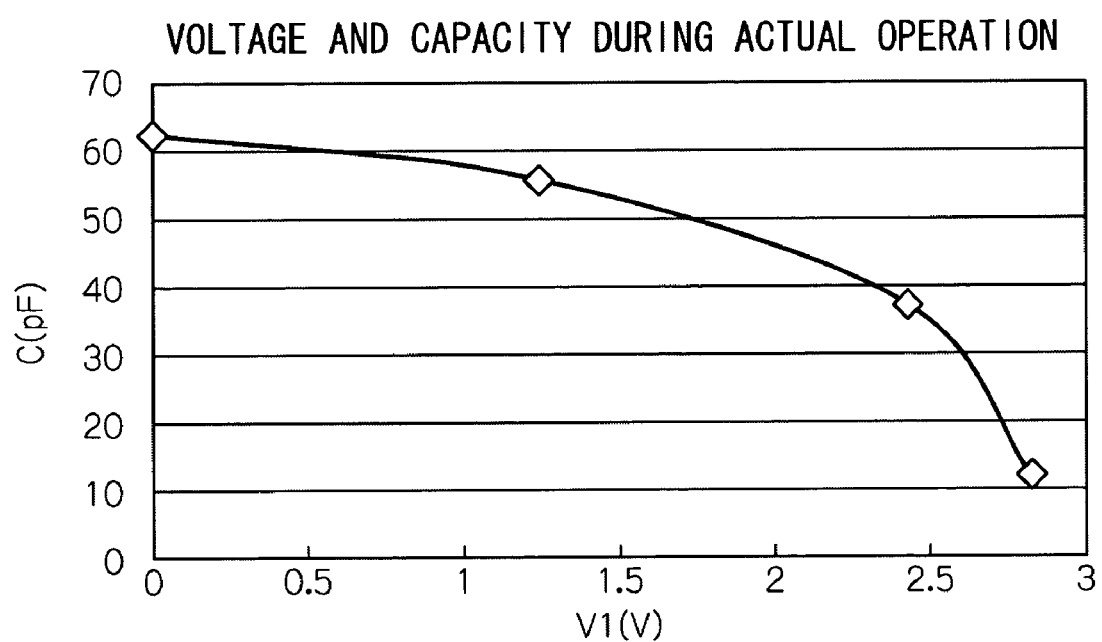

When put into actual operation and the relationship between the capacitance C of the tunable capacitor 44 and the driving voltage V1 is measured, as shown in FIG. 11C, when a braking voltage V2 of 3V is applied, the capacitance C of the tunable capacitor 44 reduces from about 60 pF to about 10 pF accompanying the increase in driving voltage V1 from 0V to 3V. At a braking voltage V2 of 0V, the capacitance C is 20.7 pF with a driving voltage V1 of 0V, and the capacitance C is 5.9 pF at a driving voltage V1 of 2.83. In contrast, when a braking voltage V2 of 3V is applied, the capacitance C of the tunable capacitor 44 increases to two or three times the amount. Namely, there is a greater variable amount in the capacitance C of the tunable capacitor 44.

Fabricating Processes of the Variable Capacitor

Explanation will now be given of the fabricating methods of the variable capacitor according to the first exemplary embodiment, with reference to FIG. 12 and FIG. 13. An example of the fabricating processes is shown in relation to a portion shown as region B in FIG. 4.

Figure 12A:
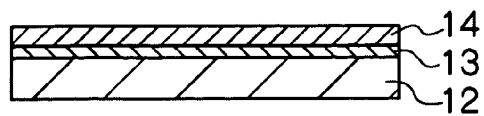
FIGS. 12A to 12H are process diagrams for explaining a fabricating method of a variable capacitor according to the first exemplary embodiment.

First, as shown in FIG. 12A, a silicon nitride ($Si_3N_4$) insulating layer 13 is formed as a film at a thickness of 500 nm on the support substrate 12, which is a silicon substrate, for example forming the $Si_3N_4$ insulating layer 13 using a known LP-CVD (Low Pressure CVD) method. A tungsten silicide ($WSi_2$) film is formed as a film at a thickness of 200 nm on the $Si_3N_4$ insulating layer 13, for example using a known sputtering method or the like, forming a $WSi_2$ drive electrode 14.

Figure 12B:
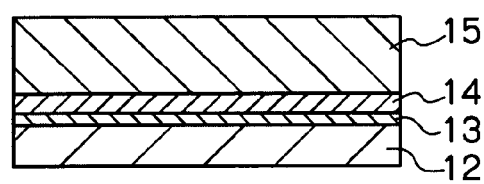

Next, as shown in FIG. 12B, a silicon oxide ($SiO_2$) layer is deposited at thickness of 3.3 μm, for example using a known LP-CVD method or the like, forming an $SiO_2$ sacrificial film 15.

Figure 12C:
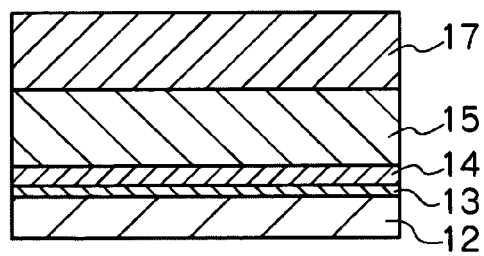

Next, as shown in FIG. 12C, in order to form the movable electrode 18 etc., a poly-crystalline silicon (Poly-Si) layer 17 is formed as a film at a thickness of 1.4 μm on the $SiO_2$ sacrificial film 15, for example using a known LP-CVD method or the like. The Poly-Si layer 17 is doped with phosphorous (P). To carry out doping, $PH_3$ is added as an impurity gas at the same time and in addition to the raw material gas of $SiH_4$. The resistance of the Poly-Si can be reduced by doping with phosphorous. The phosphorous doped Poly-Si can be viewed as a conducting body. For example, when the phosphorous is doped at $5E20/cm^3$, the resistivity of the Poly-Si film formed at 620° C. is 70 mΩ cm.

Figure 12D:
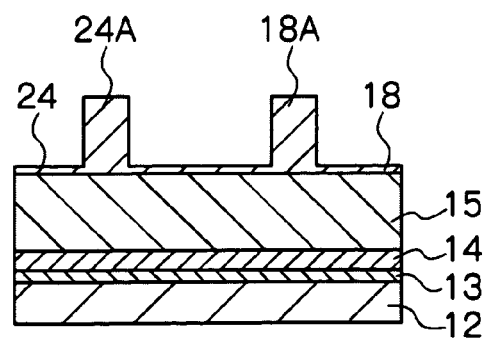

Next, as shown in FIG. 12D, patterning in a comb tooth shape is made to the Poly-Si layer 17 by known methods, for example with a combination of photolithography using a resist and dry etching or the like, forming the movable electrode 18 (comb teeth portions 18A) and the lower portion brake electrode 24 (comb teeth portions 24A). Etching is carried out in an etching process to a depth of about 1.2 μm.

Figure 12E:
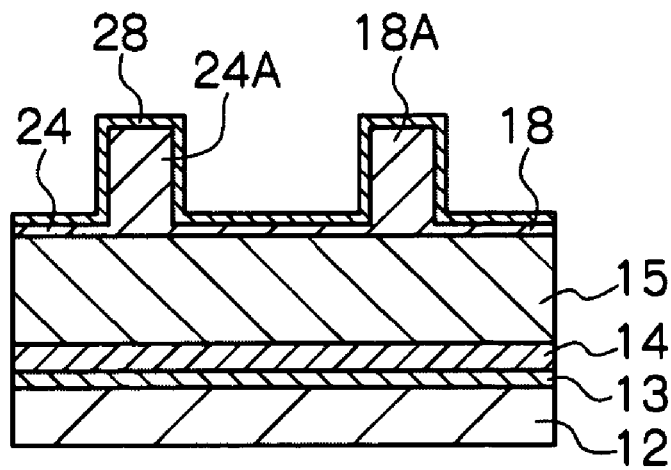

Next, as shown in FIG. 12E, a $Si_3N_4$ layer is formed as a film at a thickness of 0.1 μm over the surface of the movable electrode 18 and the lower portion brake electrode 24 that have been patterned in the Poly-Si layer 17, for example by a known LP-CVD method or the like, forming the $Si_3N_4$ dielectric layer 28.

Figure 12F:
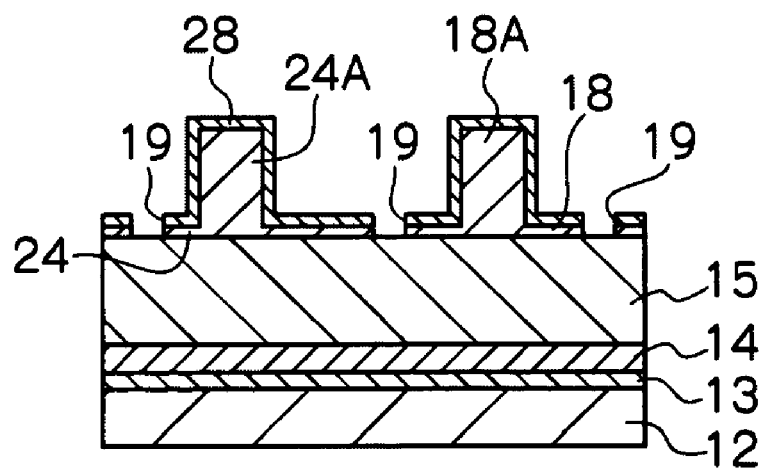
Figure 12G:
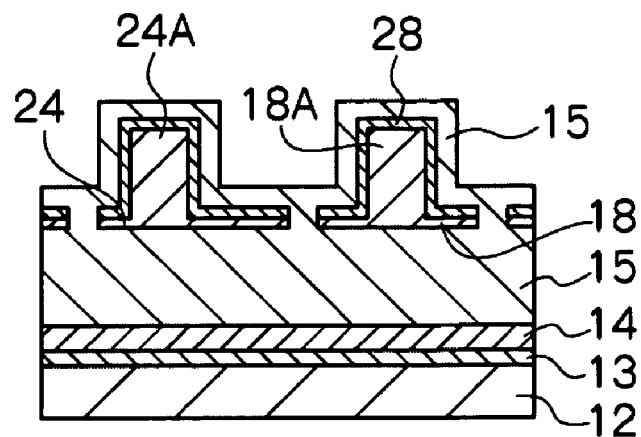

Next, as shown in FIG. 12F, the Poly-Si layer (the movable electrode 18 and the lower portion brake electrode 24) and the $Si_3N_4$ dielectric layer 28 are removed in a specific pattern, by known methods, for example with a combination of photolithography using a resist and dry etching or the like, exposing the SiO$_2$ sacrificial film 15, and forming release holes 19.

Figure 12H:
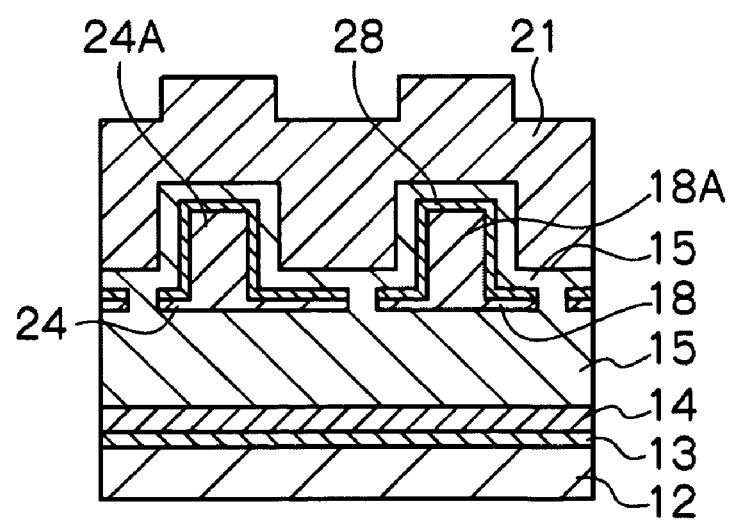

Next, as shown in FIG. 12F, the SiO$_2$ sacrificial film 15 is formed at a further 0.1 μm thickness over the surface of the movable electrode 18 and the lower portion brake electrode 24 that are covered by the Si$_3$N$_4$ dielectric layer 28, for example by a known LP-CVD method or the like. The release holes 19 are also filled in with the SiO$_2$ sacrificial film 15. Next, as shown in FIG. 12H, in order to form the fixed electrode 16 etc., a Poly-Si layer 21 is deposited at a thickness of 1.4 μm, for example by a known LP-CVD method or the like.

Figure 13I:
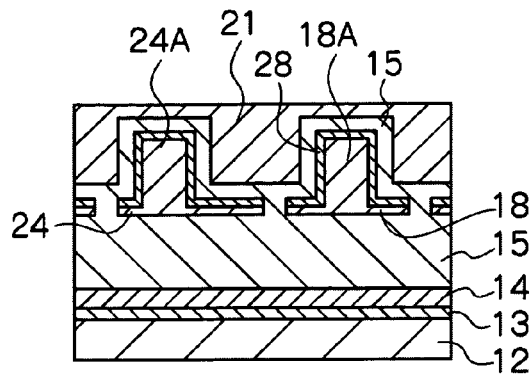
FIGS. 13I to 13N are process diagrams for explaining a fabricating method of a variable capacitor according to the first exemplary embodiment.
Figure 13J:
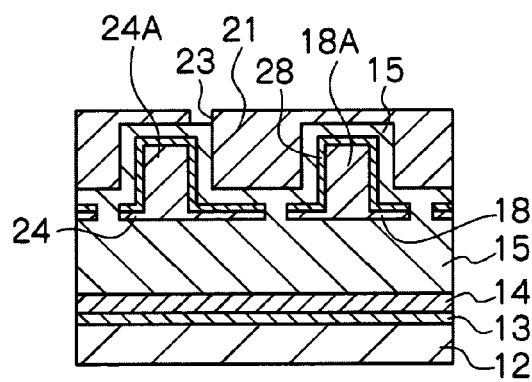

Next, as shown in FIG. 13I, the surface of the Poly-Si layer 21 is flattened, for example by employing a known method such as CMP (Chemical Mechanical Polishing) or the like. Next, as shown in FIG. 13J, in order inlay the dielectric member 26 (insulating portions), the Poly-Si layer 21 is removed in a specific pattern using dry etching, forming a groove portion 23.

Figure 13K:
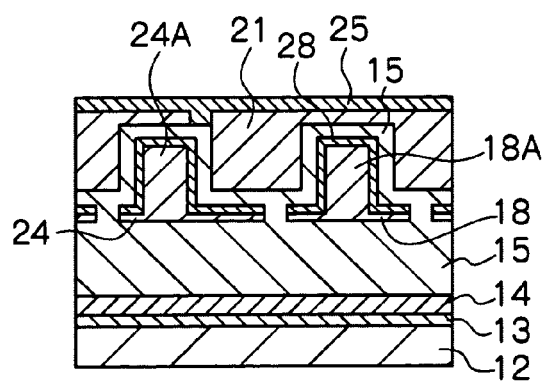
Figure 13L:
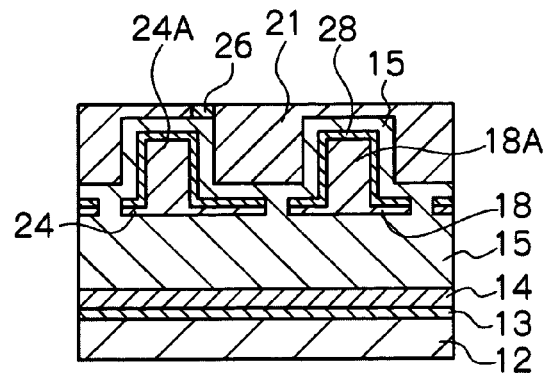
Figure 13M:
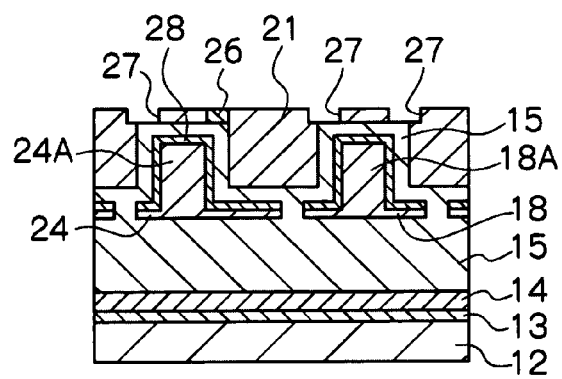

Next, as shown in FIG. 13K, a Si$_3$N$_4$ layer 25 is formed as a film at a thickness of 200 nm on the surface of the Poly-Si layer 21 that has been formed with the groove portion 23. Next, as shown in FIG. 13L, etching is performed until the surface of the Poly-Si layer 21 is exposed, non-required portions of the Si$_3$N$_4$ layer 25 are removed, forming the inlaid Si$_3$N$_4$ dielectric member 26. Next, as shown in FIG. 13M, the surface of the Poly-Si layer 21 is removed in a specific pattern, and release holes 27 are formed for releasing the SiO$_2$ sacrificial film 15.

Figure 13N:
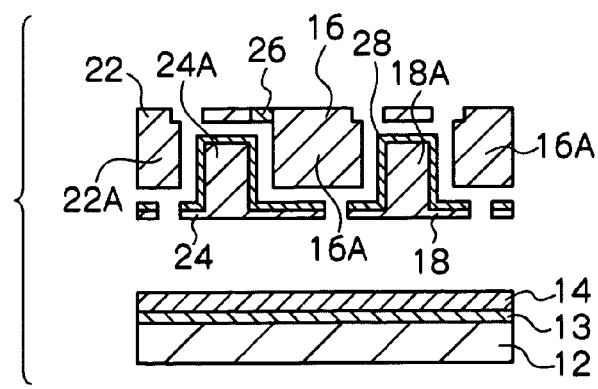

Finally, as shown in FIG. 13N, in order to form the fixed electrode 16 (comb teeth portions 16A) and the upper portion brake electrode 22 (comb teeth portion 22A), the SiO$_2$ sacrificial film 15 is released using a known method. Removal is, for example, by wet etching in which hydrofluoric acid is permeated into the SiO$_2$ sacrificial film 15. Since Si$_3$N$_4$ is substantially insoluble to hydrofluoric acid, the SiO$_2$ sacrificial film 15 can be selectively removed.

By using these processes, the movable electrode 18 (comb teeth portions 18A) and the lower portion brake electrode 24 (comb teeth portions 24A) are parted from the fixed electrode 16 (comb teeth portions 16A) and the upper portion brake electrode 22 (comb teeth portion 22A), and also from the drive electrode 14, so as to be able to move freely.

As described above, in the variable capacitor of the present exemplary embodiment, when a driving voltage V1 is applied to the drive capacitor with the braking voltage V2 at 0V, the movable electrode moves toward the drive electrode, changing the capacitance C of the tunable capacitor. When, in this state, the braking voltage V2 is also applied to the brake capacitor, the comb teeth portions of the moveable electrode and the comb teeth portions of the drive electrode make contact with each other, with the dielectric layer interposed therebetween, fixing the position of the moveable electrode by frictional force, and preventing the moveable electrode from vibrating due to external vibration. The tunable capacitor can thereby be operated stably at the desired capacitance C.

In the present exemplary embodiment, the variable amount of the capacitance of the tunable capacitor also becomes larger by application of the braking voltage V2.

In the present exemplary embodiment, since the upper portion brake electrode is integrally formed with the fixed electrode, the fabricating processes of the variable capacitor are further simplified in comparison to cases where the upper portion brake electrode and the fixed electrode are formed separately.

Second Exemplary Embodiment

Figure 14A:
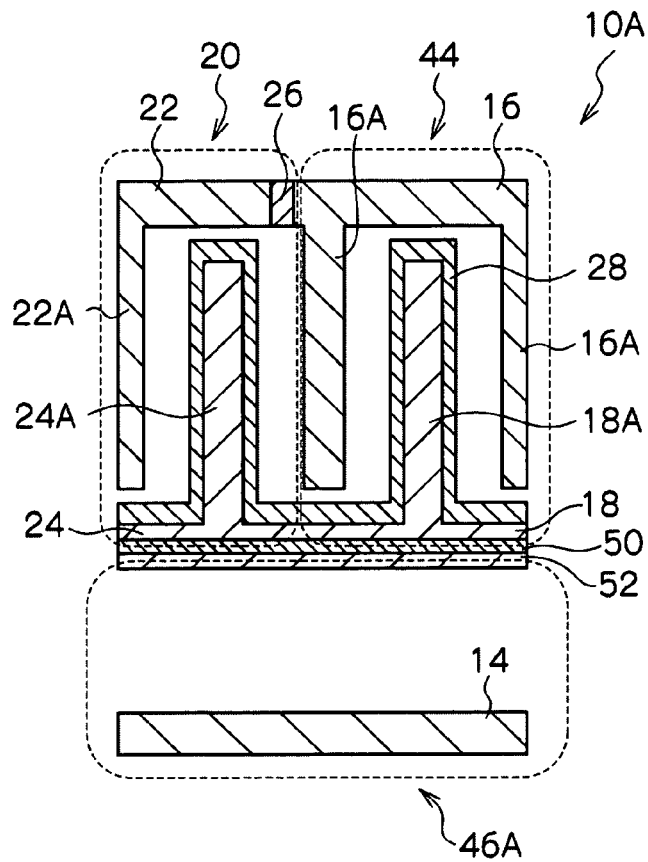
FIGS. 14A to 14C are enlarged diagrams of portions of a variable capacitor according to a second exemplary embodiment of the present invention.
Figure 14B:
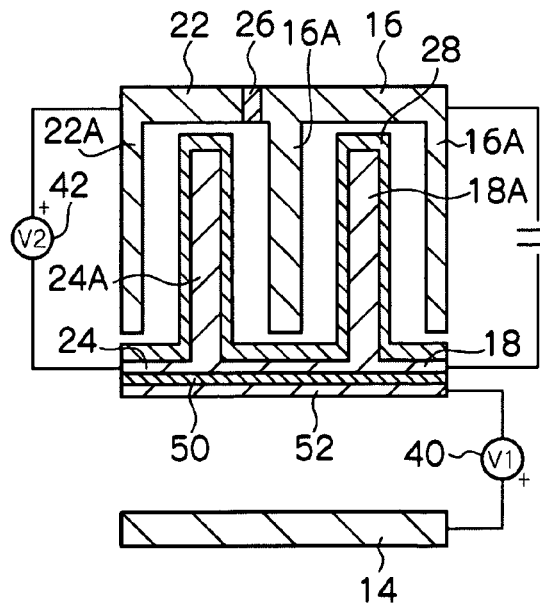
Figure 14C:
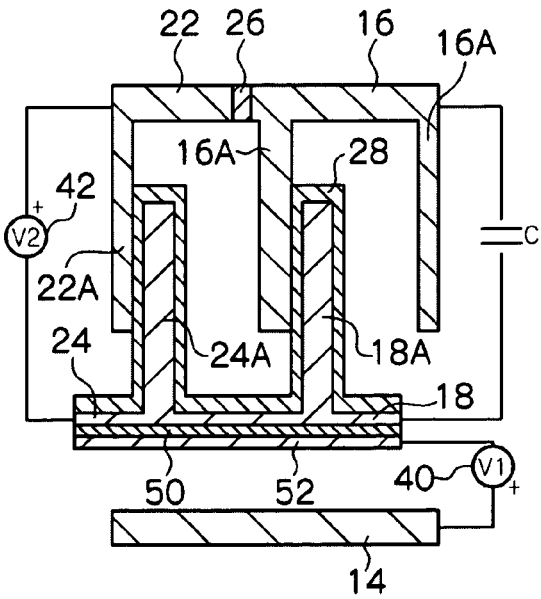

FIGS. 14A to 14C are enlarged diagrams of portions of a variable capacitor according to a second exemplary embodiment of the present invention. FIG. 14A is a diagram corresponding to FIG. 6 of the first exemplary embodiment. A variable capacitor 10A according to the second exemplary embodiment is of similar configuration to that of the first exemplary embodiment, except in that a movable drive electrode 52 is formed to the back face of the movable electrode 18 to which the lower portion brake electrode 24 is attached, with an insulating layer 50 interposed therebetween. Therefore similar portions will be allocated the same reference numerals and part of the explanation thereof will be omitted.

As shown in FIG. 14A, a movable electrode 18 and a lower portion brake electrode 24 are integrally formed from an electrically-conductive material, as a member of rectangular shape in plan view. The portion of this member facing a fixed electrode 16 is the movable electrode 18, and the portion thereof facing an upper portion brake electrode 22 is a lower portion brake electrode 24. The member is equipped with a substrate of rectangular shape in plan view.

On the front surface of this substrate are provided plural comb teeth portions 18A that project out from the substrate toward the fixed electrode 16, and a single or plural comb teeth portions 24A that project out toward the upper portion brake electrode 22. The surfaces of the movable electrode 18 and the lower portion brake electrode 24 that are formed with the comb teeth portions are covered with a dielectric layer 28. The movable drive electrode 52 is formed on the back face of the substrate, with the insulating layer 50 interposed therebetween. Namely, the movable electrode 18, the lower portion brake electrode 24, the insulating layer 50, and the movable drive electrode 52 are integrally formed.

The surface area of the movable electrode 18, to which the lower portion brake electrode 24 is attached, is about the same size as the surface area of the facing drive electrode 14. The surface area of the movable drive electrode 52 that is formed with the interposed insulating layer 50 is also about the same size as the surface area of the facing drive electrode 14.

In the present exemplary embodiment, the surface area of the movable electrode 18, to which the lower portion brake electrode 24 is attached, and the surface area of the movable drive electrode 52 that is formed with the interposed insulating layer 50, are each set as 300 μm×300 μm. The thickness of the movable electrode 18 and the lower portion brake electrode 24 is about 1.25 μm. The thickness of the substrate is about 0.05 μm, the height of the comb teeth portions about 1.2 μm, giving a total thickness of about 1.25 μm. The thickness of the dielectric layer 28 is about 0.1 μm. The thickness of the insulating layer 50 is about 0.1 μm. The thickness of the movable drive electrode 52 is about 0.05 μm.

In the present exemplary embodiment, poly-crystalline silicon (Poly-Si) is employed as the electrically-conductive material used in the movable electrode 18, the lower portion brake electrode 24, and the movable drive electrode 52. Silicon nitride (Si$_3$N$_4$) is employed for the dielectric layer 28 and the insulating layer 50.

In a similar manner to in the first exemplary embodiment, the variable capacitor 10A is configured, from the functional perspective, by three types of capacitor: the brake capacitor 20; a tunable capacitor 44; and a drive capacitor 46A. In the present exemplary embodiment the drive capacitor 46A is configured from the drive electrode 14 and the movable drive electrode 52.

As shown in FIG. 14A, in order to perform capacitance adjusting operation, a positive voltage of V1 is applied to the drive capacitor 46A with the braking voltage V2 at 0V. The driving voltage V1 is applied between the drive electrode 14 and the movable drive electrode 52, from a power source 40. The inter electrode separation distance of the drive capacitor 46A in the vertical direction is thereby reduced, and the movable electrode 18 moves with the movable drive electrode 52 toward the drive electrode 14.

The facing electrode surface area of the tunable capacitor 44 reduces, and the facing separation distance of the fixed electrode 16 and the movable electrode 18 also increases. The capacitance C of the tunable capacitor 44 thereby becomes smaller. In the present exemplary embodiment, the movable drive electrode 52 of the drive capacitor 46A is insulated from the movable electrode 18 of the tunable capacitor 44 by the insulating layer 50, and is completely electrically partitioned therefrom. Therefore, when operating the tunable capacitor 44, influence (occurrence of noise etc.) due to the driving voltage V1 is reduced.

As shown in FIG. 14C, to perform vibration prevention operation a braking voltage V2 is applied to the brake capacitor 20. The braking voltage V2 is applied between the upper portion brake electrode 22 and the lower portion brake electrode 24 from the power source 42. When the braking voltage V2 is applied, the lower portion brake electrode 24 moves in a horizontal direction, with the inter electrode separation distance of the upper portion brake electrode 22 and the lower portion brake electrode 24 in the horizontal direction becoming 0 µm. The movable electrode 18 that is integrally formed with the lower portion brake electrode 24 also moves in the horizontal direction, and the inter electrode separation distance between the movable electrode 18 and the fixed electrode 16 also becomes 0 µm. Namely, the facing electrodes make contact with each other, with the dielectric layer 28 interposed therebetween.

It is thereby possible, in a similar manner to in the first exemplary embodiment, to make the movable electrode 18 and the fixed electrode 16 contact over a large surface area, and the movable electrode 18 can be stably maintained in a specific position by frictional force between the electrodes. There is also a larger variable amount for the capacitance C of the tunable capacitor 44.

Explanation will now be given of a fabricating method of the variable capacitor according to the second exemplary embodiment, with reference to FIG. 15 and FIG. 16. Only a simple explanation will be given of processes similar to those of the first exemplary embodiment.

Figure 15A:
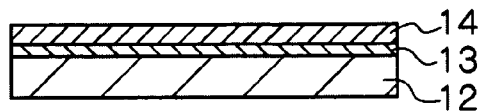
FIGS. 15A to 15H are process diagrams for explaining a fabricating method of a variable capacitor according to the second exemplary embodiment.
Figure 15B:
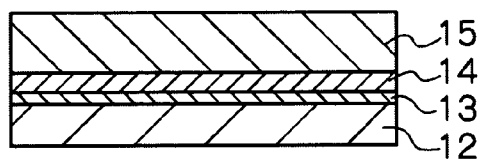

First, as shown in FIG. 15A, a $Si_3N_4$ insulating layer 13 is formed as a film at a thickness of 500 nm on the support substrate 12. A $WSi_2$ film is formed at a thickness of 200 nm on the $Si_3N_4$ insulating layer 13, forming a $WSi_2$ drive electrode 14. Next, as shown in FIG. 15B, $SiO_2$ is deposited at thickness of 3.3 µm on the $WSi_2$ drive electrode 14, forming an $SiO_2$ sacrificial film 15.

Figure 15C:
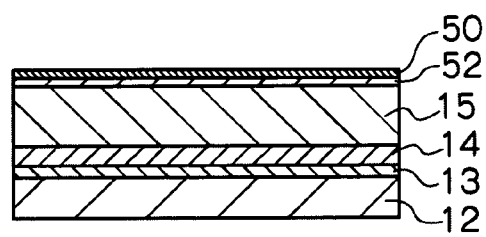

Next, as shown in FIG. 15C, a Poly-Si film is formed as a film at a thickness of 50 nm on the $SiO_2$ sacrificial film 15, for example using a known LP-CVD method or the like, forming the movable drive electrode 52. As $Si_3N_4$ film is then formed as a film at a thickness of 0.1 µm on the movable drive electrode 52, using a known LP-CVD method or the like, forming a $Si_3N_4$ insulating layer 50.

Figure 15D:
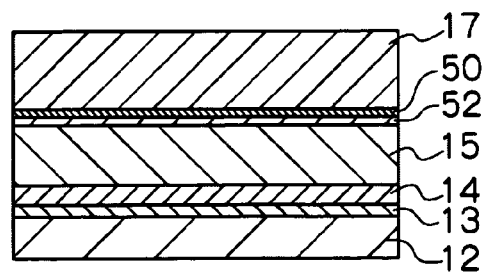
Figure 15E:
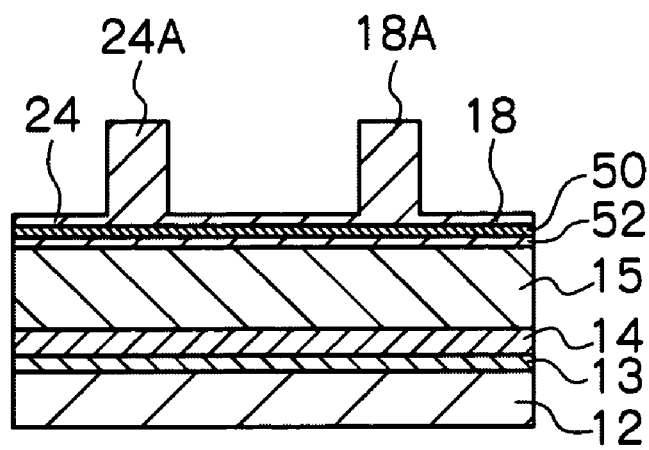

Next, as shown in FIG. 15D, in order to form the movable electrode 18 etc., a Poly-Si layer 17 is formed as a film at a thickness of 1.4 µm on the movable drive electrode 52. The Poly-Si layer 17 is doped with phosphorous (P). Next, as shown in FIG. 15E, patterning in a comb tooth shape is made to the Poly-Si layer 17, forming the movable electrode 18 (comb teeth portions 18A) and the lower portion brake electrode 24 (comb teeth portions 24A). Etching in an etching process is to a depth of about 1.2 µm.

Figure 15F:
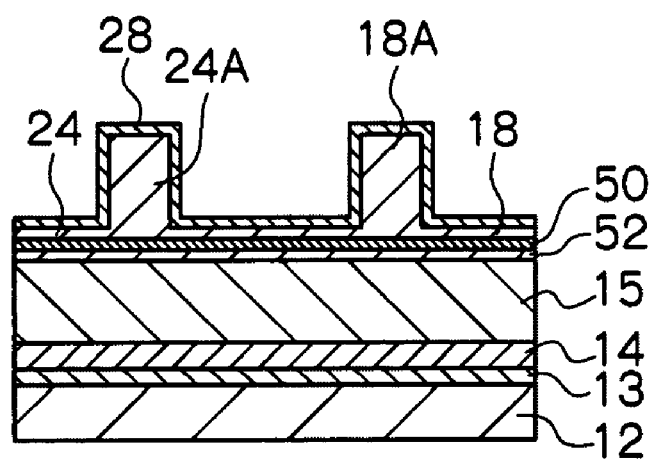
Figure 15G:
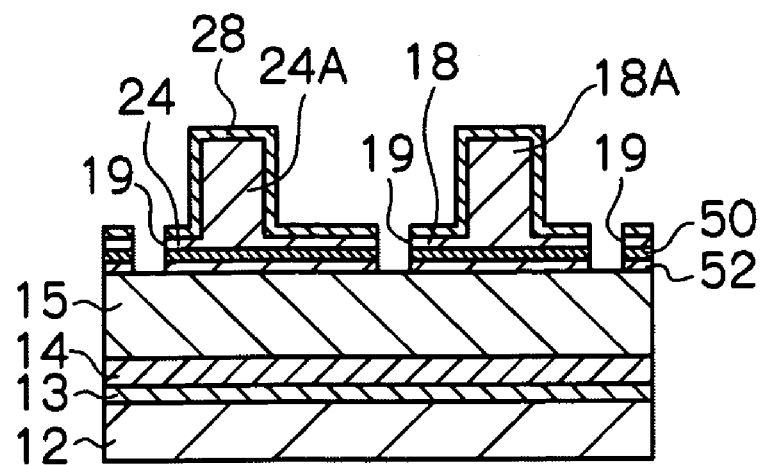
Figure 15H:
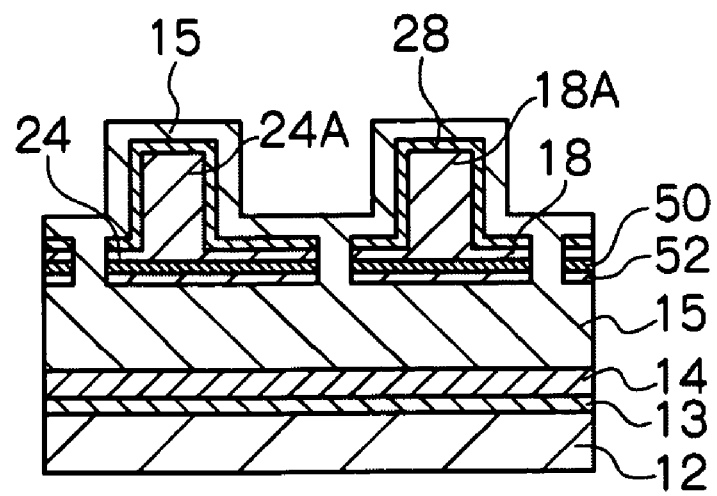

Next, as shown in FIG. 15F, a $Si_3N_4$ layer is formed as a film at a thickness of 0.1 µm over the surface of the movable electrode 18 and the lower portion brake electrode 24 that have been patterned in the Poly-Si layer 17, forming the $Si_3N_4$ dielectric layer 28. Next, as shown in FIG. 15Q the movable drive electrode 52, the insulating layer 50, the Poly-Si layer (the movable electrode 18 and the lower portion brake electrode 24) and the $Si_3N_4$ dielectric layer 28 are removed in a specific pattern, exposing the $SiO_2$ sacrificial film 15, and forming release holes 19. Next, as shown in FIG. 15H, the $SiO_2$ sacrificial film 15 is formed as a film at a further thickness of 0.1 µm. The release holes 19 are also filled in with the $SiO_2$ sacrificial film 15.

Figure 16I:
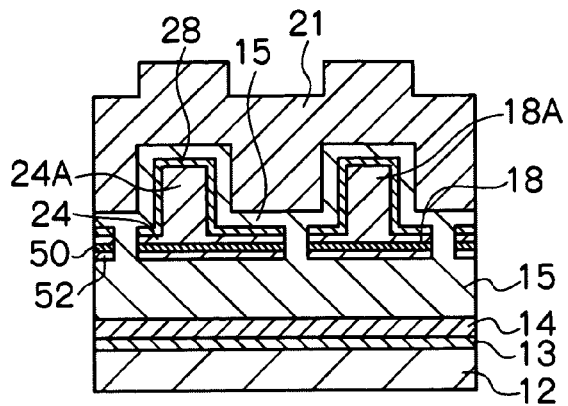
FIGS. 16I to 16O are process diagrams for explaining a fabricating method of a variable capacitor according to the second exemplary embodiment.
Figure 16J:
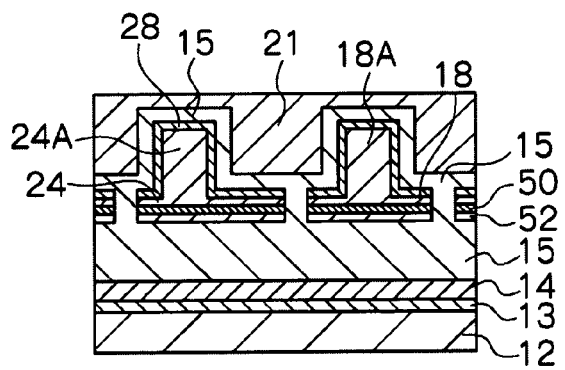
Figure 16K:
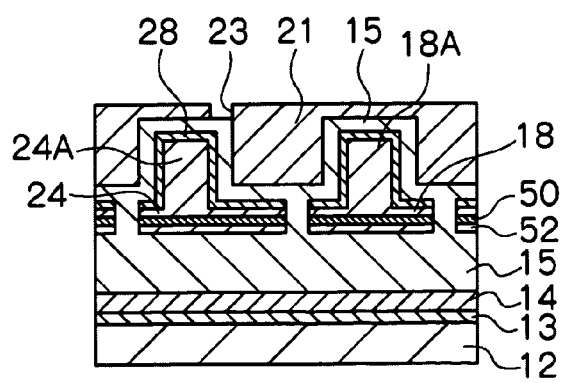
Figure 16L:
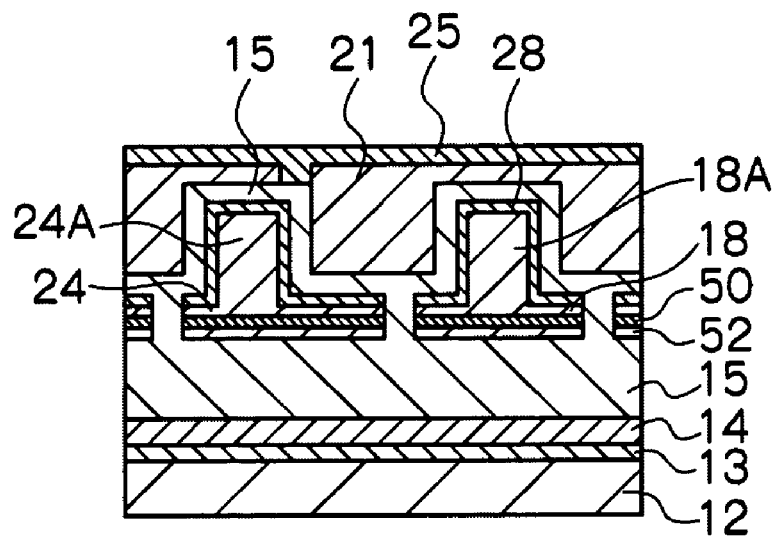
Figure 16M:
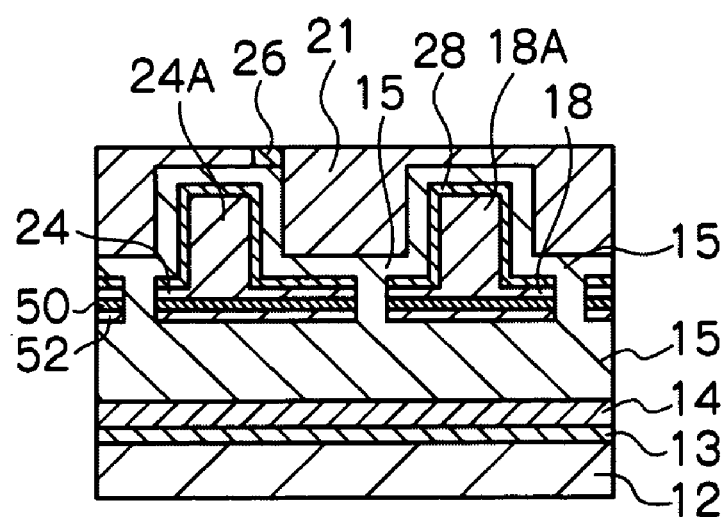
Figure 16N:
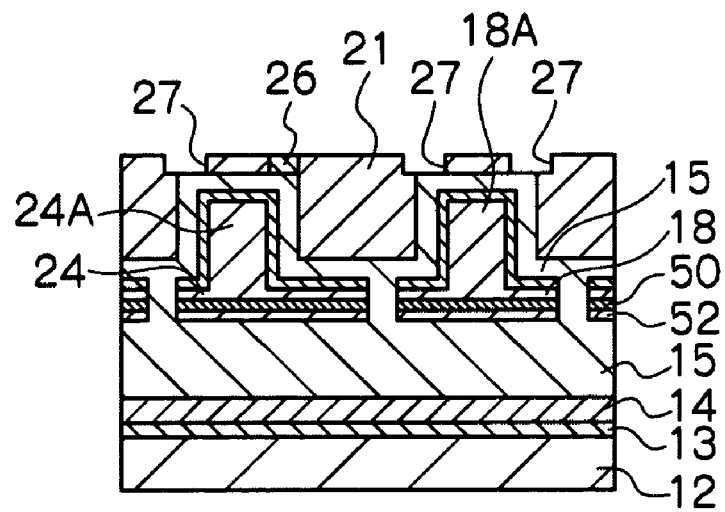

Next, as shown in FIG. 16I, in order to form the fixed electrode 16 etc., a Poly-Si layer 21 is deposited at a thickness of 1.4 µm. Next, as shown in FIG. 16J, the surface of the Poly-Si layer 21 is flattened. Next, as shown in FIG. 16K, the Poly-Si layer 21 is removed in a specific pattern, forming a groove portion 23. Next, as shown in FIG. 16L, a 200 nm thick $Si_3N_4$ layer 25 is formed as a film so as to fill in the groove portion 23. Next, as shown in FIG. 16M, etching is performed until the surface of the Poly-Si layer 21 is exposed, non-required portions of the $Si_3N_4$ layer 25 are removed, forming the inlayed $Si_3N_4$ dielectric member 26. Next, as shown in FIG. 16N, the surface of the Poly-Si layer 21 is removed in a specific pattern, and release holes 27 are formed for releasing the $SiO_2$ sacrificial film 15.

Figure 16O:
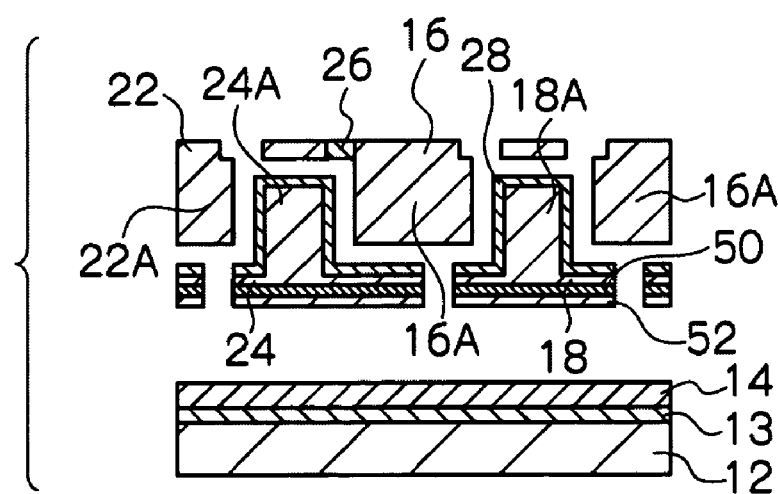

Finally, as shown in FIG. 16O, in order to form the fixed electrode 16' and the upper portion brake electrode 22, the $SiO_2$ sacrificial film 15 is released. By using these processes, the movable electrode 18, the lower portion brake electrode 24, the insulating layer 50, and the movable drive electrode 52, are parted from the fixed electrode 16 and the upper portion brake electrode 22, and also from the drive electrode 14, so as to be able to move freely.

As described above, in the variable capacitor of the present exemplary embodiment, when a driving voltage V1 is applied to the drive capacitor with the braking voltage V2 at 0V, the movable electrode moves toward the drive electrode, changing the capacitance C of the tunable capacitor. When, in this state, a braking voltage V2 is also applied to the brake capacitor, the comb teeth portions of the moveable electrode and the comb teeth portions of the drive electrode make contact with each other, with the dielectric layer disposed therebetween, fixing the position of the moveable electrode by frictional force, and preventing the moveable electrode from vibrating due to external vibration. The tunable capacitor can thereby be operated stably at the desired capacitance C.

In the present exemplary embodiment, the variable amount of the capacitance of the tunable capacitor also becomes larger by application of the braking voltage V2.

In the present exemplary embodiment, since the upper portion brake electrode is integrally formed with the fixed electrode, the fabricating processes of the variable capacitor are further simplified in comparison to cases where the upper portion brake electrode and the fixed electrode are formed separately.

Furthermore, in the present exemplary embodiment, the movable drive electrode of the drive capacitor is insulated from the moveable electrode of the tunable capacitor by the insulating layer, and so influence from the driving voltage V1 during movement of the tunable capacitor is reduced.

Third Exemplary Embodiment

Figure 17:
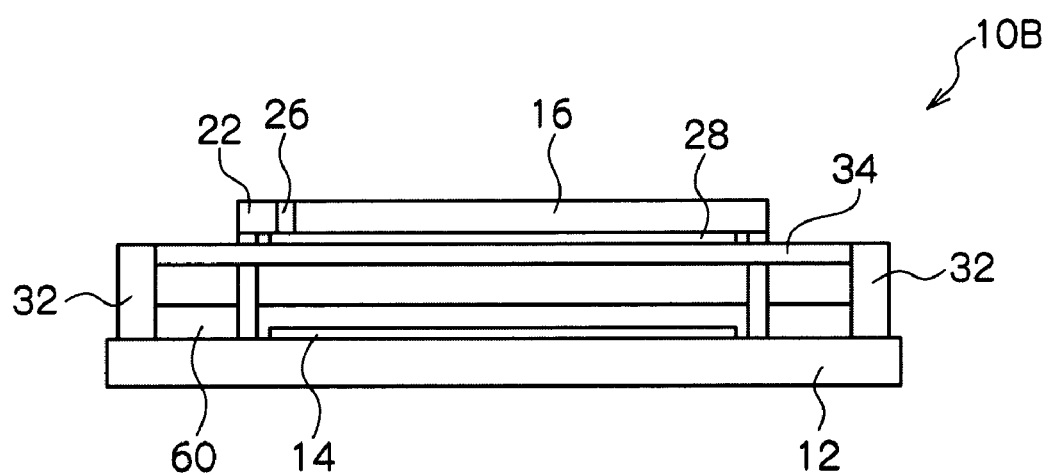
FIG. 17 is side view of a variable capacitor according to a third exemplary embodiment of the present invention.
Figure 18A:
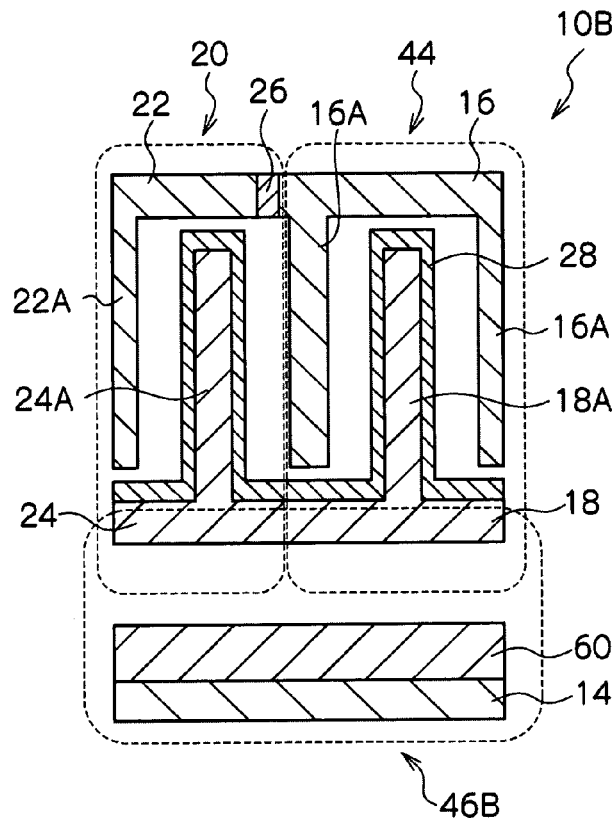
FIG. 18A to 18C are enlarged diagrams of portions of a variable capacitor according to a third exemplary embodiment of the present invention.
Figure 18B:
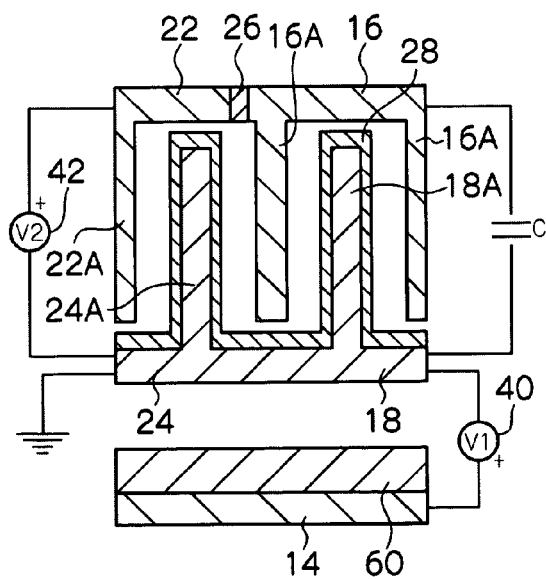
Figure 18C:
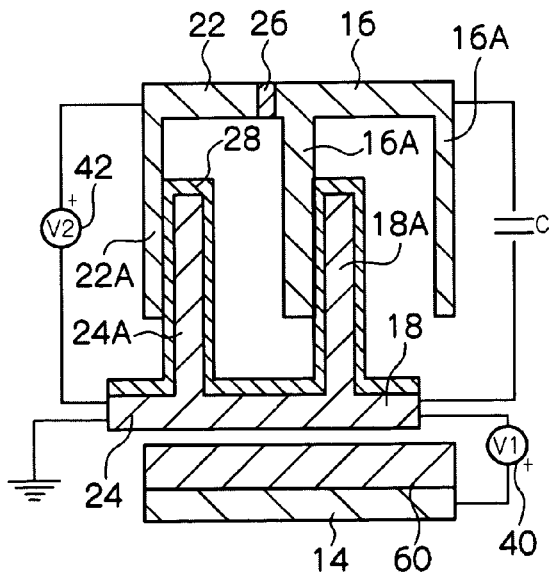

FIG. 17 is a side view of a variable capacitor according to a third exemplary embodiment of the present invention. FIGS. 18A to 18C are enlarged diagrams of portions of a variable capacitor according to the third exemplary embodiment of the present invention. FIG. 17 is a diagram corresponding to FIG. 3 of the first exemplary embodiment. FIG. 18A is a diagram corresponding to FIG. 6 of the first exemplary embodiment. A variable capacitor 10B according to the third exemplary embodiment is of similar configuration to that of the first exemplary embodiment, except in that a dielectric layer 60 is provided on the support substrate 12 so as to cover the drive electrode 14. Therefore similar portions will be allocated the same reference numerals and part of the explanation thereof omitted In a similar manner to in the first exemplary embodiment, a drive electrode 14 of a rectangular shape in plan view that is slightly smaller than a support substrate 12, is formed at the middle of the support substrate 12. A dielectric layer 60 is provided on the support substrate 12 so as to cover the drive electrode 14, the dielectric layer 60 being a thicker film than the drive electrode 14. In the present exemplary embodiment the thickness of the drive electrode 14 is about 0.2 μm, and the thickness of the dielectric layer 60 is about 2.2 μm. $WSi_2$ is employed for the electrically-conductive material used for the drive electrode 14, and $Si_3N_4$ is employed for the dielectric layer 60.

As shown in FIG. 18A, the variable capacitor 10B is configured, in a similar manner to that of the first exemplary embodiment, from the functional perspective, by three types of capacitor: a brake capacitor 20; a tunable capacitor 44; and a drive capacitor 46B. In the present exemplary embodiment, the drive capacitor 46B is configured from a drive electrode 14, the dielectric layer 60, and a movable electrode 18.

As shown in FIG. 18B, to perform capacitance adjusting operation, a positive voltage of V1 is applied to the drive capacitor 46B with the braking voltage V2 at 0V The driving voltage V1 is applied between the drive electrode 14 and the movable electrode 18 from the power source 40. The inter electrode separation distance of the drive capacitor 46B is thereby reduced, and the movable electrode 18 moves toward the drive electrode 14. The facing electrode surface area of the tunable capacitor 44 reduces, and the facing separation distance of the fixed electrode 16 and the movable electrode 18 increases. The capacitance C of the tunable capacitor 44 thereby becomes smaller.

In the present exemplary embodiment, by introducing the dielectric layer 60 between the drive electrode 14 and the movable electrode 18, the capacitance of the drive capacitor 46B becomes larger in comparison to that of the first exemplary embodiment. As shown in Equation (6) below, the spring constant k of the drive capacitor 46B is the sum of the mechanical spring constant $k_m$ of the beam portions (beam portions 34 and spring members 36) and the electrical spring constant $k_e$.

$$k = k_m - k_e \quad \text{Equation (6)}$$

As can be seen from Equation (7) below, the electrical spring constant $k_e$ also becomes larger as the capacitance of the drive capacitor 46B increases. Each of the parameters here are those relating to the drive capacitor 46B, wherein C is the parallel plate capacitance, V is the voltage applied to parallel plates, and d is the inter electrode separation distance.

$$k_e = \frac{CV^2}{d^2} \quad \text{Equation (7)}$$

Using the above, for example, when it is difficult to design a low mechanical spring constant $k_m$ for the above beam portions, the spring constant k of the drive capacitor 46B can be adjusted by controlling the electrical spring constant $k_e$ by changing the thickness of the dielectric layer 60.

As shown in FIG. 18C, the braking voltage V2 is applied to the brake capacitor 20 in order to execute vibration prevention operation. The braking voltage V2 from the power source 42 is applied between the upper portion brake electrode 22 and the lower portion brake electrode 24. When the braking voltage V2 is applied, the lower portion brake electrode 24 of the brake capacitor 20 moves in a horizontal direction, with the inter electrode separation distance of the upper portion brake electrode 22 and the lower portion brake electrode 24 in becoming 0 μm.

The movable electrode 18 that is integrally formed with the lower portion brake electrode 24 also moves in the horizontal direction, and the inter electrode separation distance of the movable electrode 18 and the fixed electrode 16 in the horizontal direction also becomes 0 μm. Namely, both electrodes make contact with each other, with the dielectric layer 28 interposed therebetween. It is thereby possible for the movable electrode 18 and the fixed electrode 16 to make contact over a large surface area, and the movable electrode 18 can be stably maintained in a specific position by frictional force between the electrodes. There is also a large variable amount for the capacitance C of the tunable capacitor 44.

The variable capacitor 10B of the third exemplary embodiment can be fabricated by similar fabricating processes to those of the first exemplary embodiment, except for differences of the processes explained below. In the process shown in FIG. 12A of the first exemplary embodiment, the $Si_3N_4$ insulating layer 13 is formed as a film at a thickness of 500 nm on the support substrate 12, which is a silicon substrate, and the $WSi_2$ drive electrode 14 is formed as a film at a thickness of 200 nm on the $Si_3N_4$ insulating layer 13.

Then, the $Si_3N_4$ dielectric layer 60 is formed at a thickness of 2.2 μm on the $WSi_2$ drive electrode 14, using a known LP-CVD method or the like. Next, in the process shown in FIG. 12B, $SiO_2$ is deposited at thickness of 1.1 μm on the $Si_3N_4$ dielectric layer 60, using a known LP-CVD method or the like, forming the sacrificial film 15.

As described above, in the variable capacitor of the present exemplary embodiment, when a driving voltage V1 is applied to the drive capacitor with the braking voltage V2 at 0V, the movable electrode moves toward the drive electrode, changing the capacitance C of the tunable capacitor. When, in this state, a braking voltage V2 is also applied to the brake capacitor, the comb teeth portions of the moveable electrode-side and the comb teeth portions of the drive electrode-side make contact with each other, with the dielectric layer disposed therebetween, fixing the position of the moveable electrode by frictional force, and preventing the moveable electrode from vibrating due to external vibration. The tunable capacitor can thereby be stably operated at the desired capacitance C.

In the present exemplary embodiment, variable amount of the capacitance of the tunable capacitor also becomes larger by application of the braking voltage V2.

In the present exemplary embodiment, since the upper portion brake electrode is integrally formed with the fixed electrode, the fabricating processes of the variable capacitor are also further simplified in comparison to cases where the upper portion-brake electrode and the fixed electrode are formed separately.

Furthermore, in the present exemplary embodiment, the dielectric layer is inserted between the electrodes of the drive capacitor, and therefore the capacitance of the drive capacitor becomes extremely large. The spring constant of the drive capacitor is the sum of the mechanical spring constant and the electrical spring constant of the beam portions. Since the electrical spring constant also gets larger with an increase in the capacitance of the drive capacitor, the spring constant of the drive capacitor can be adjusted using this effect by controlling the electrical spring constant by changing the thickness of the dielectric layer.

Fourth Exemplary Embodiment

Figure 19A:
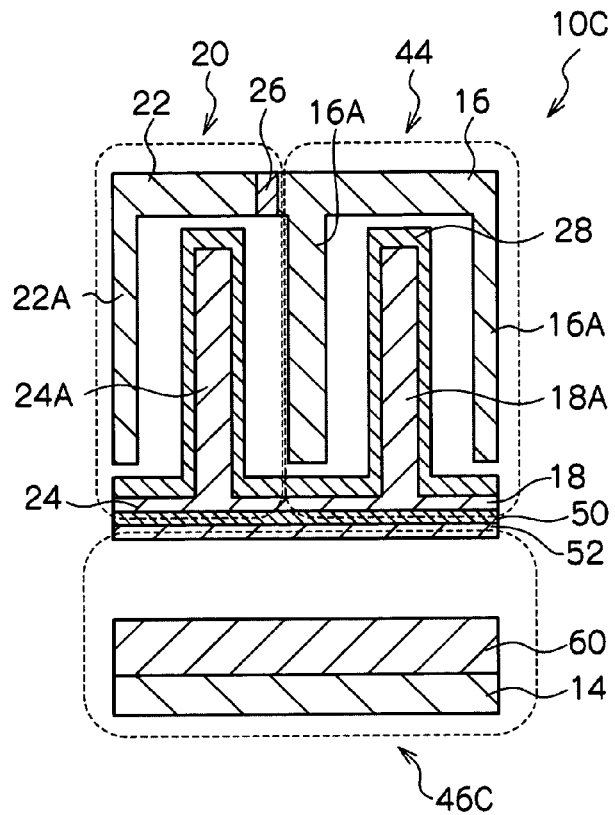
FIG. 19A to 19C are enlarged diagrams of portions of a variable capacitor according to a fourth exemplary embodiment of the present invention.
Figure 19B:
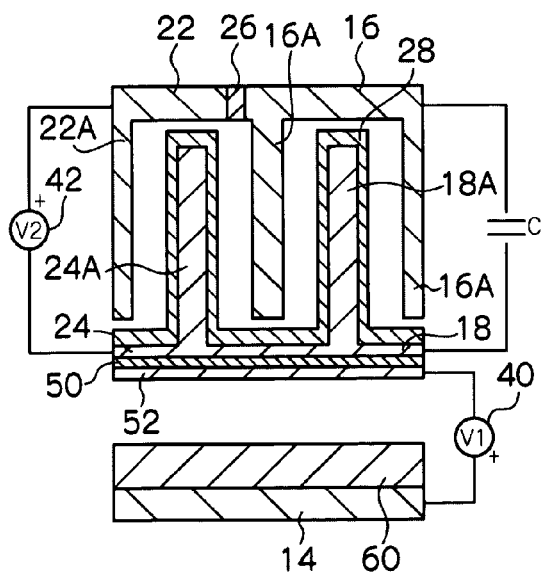
Figure 19C:
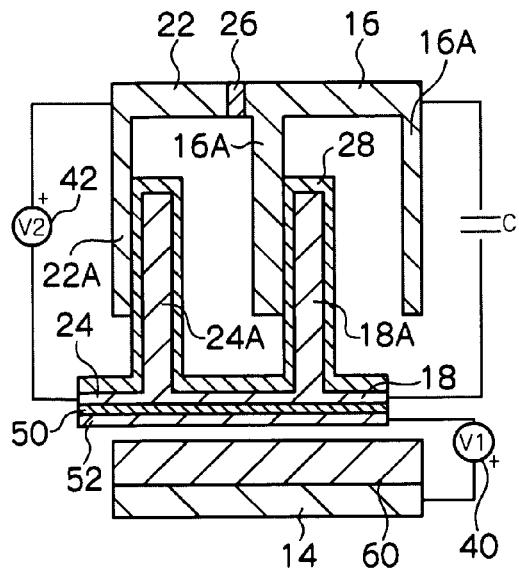

FIGS. 19A to 19C are enlarged diagrams of portions of a variable capacitor according to the fourth exemplary embodiment of the present invention. FIG. 19A is a diagram corresponding to FIG. 6 of the first exemplary embodiment. A variable capacitor 10C according to the fourth exemplary embodiment is of similar configuration to that of the first exemplary embodiment, except in that: in a similar manner to the second exemplary embodiment, an insulating layer 50 is provided to the rear face of a movable electrode 18 that has the lower portion brake electrode 24 attached thereto, with the movable drive electrode 52 interposed between the insulating layer 50 and the movable electrode 18; and, in a similar manner to the third exemplary embodiment, a dielectric layer 60 is provided on the support substrate 12 so as to cover the drive electrode 14. Therefore similar portions will be allocated the same reference numerals and part of the explanation thereof omitted.

In the variable capacitor of the present exemplary embodiment, in a similar manner to in the first to the third exemplary embodiments, by preventing the moveable electrode from vibrating due to external vibration the tunable capacitor can thereby be operated stably at the desired capacitance. The variable amount of the capacitance of the tunable capacitor also becomes larger by application of the braking voltage V2. Since the upper portion brake electrode is integrally formed with the fixed electrode, the fabricating processes of the variable capacitor are further simplified.

In addition, similarly to in the second exemplary embodiment, the movable drive electrode of the drive capacitor is insulated from the moveable electrode of the tunable capacitor by the insulating layer, and so influence from the driving voltage V1 during movement of the tunable capacitor is reduced.

Furthermore, similarly to in the third exemplary embodiment, making use of the fact that the electrical spring constant also gets larger with an increase in the capacitance of the drive capacitor, the spring constant of the drive capacitor can be adjusted by controlling the electrical spring constant by changing the thickness of the dielectric layer.

Fifth Exemplary Embodiment

Outline Configuration of the Variable Capacitor

Figure 20:
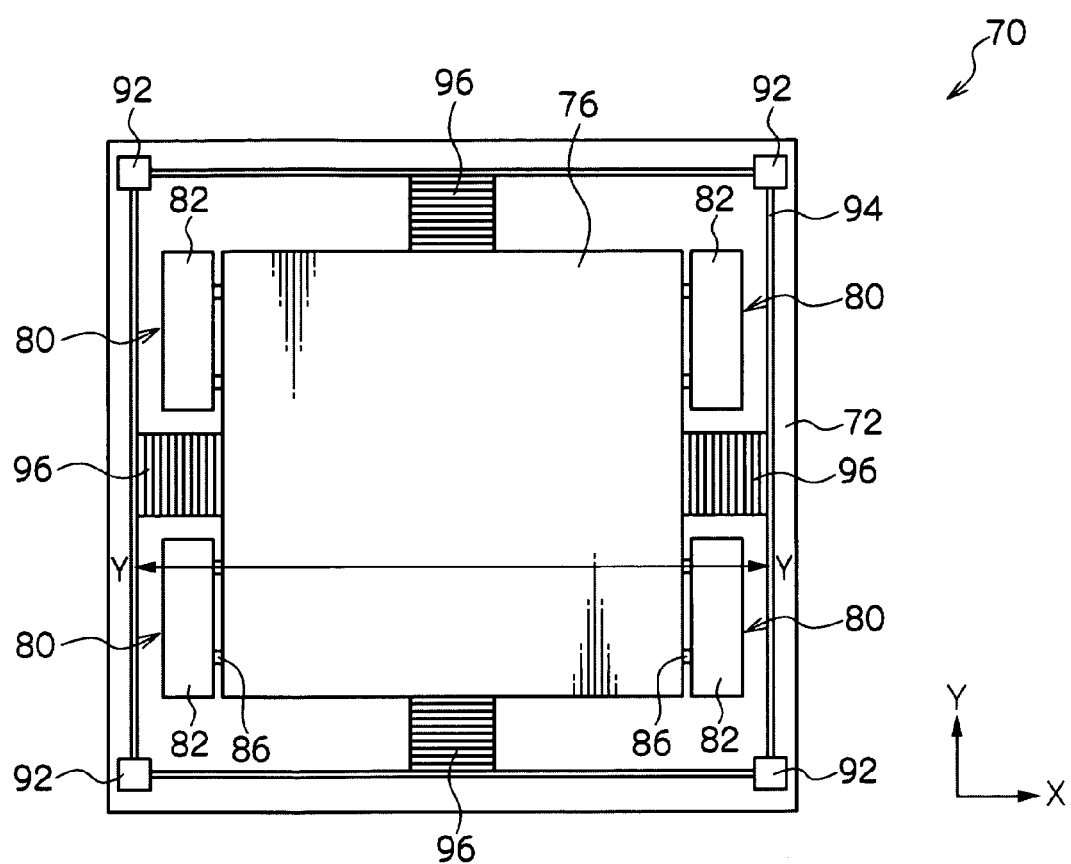
FIG. 20 is a plan view of a variable capacitor according to a fifth exemplary embodiment of the present invention, as seen from a fixed electrode.
Figure 21:
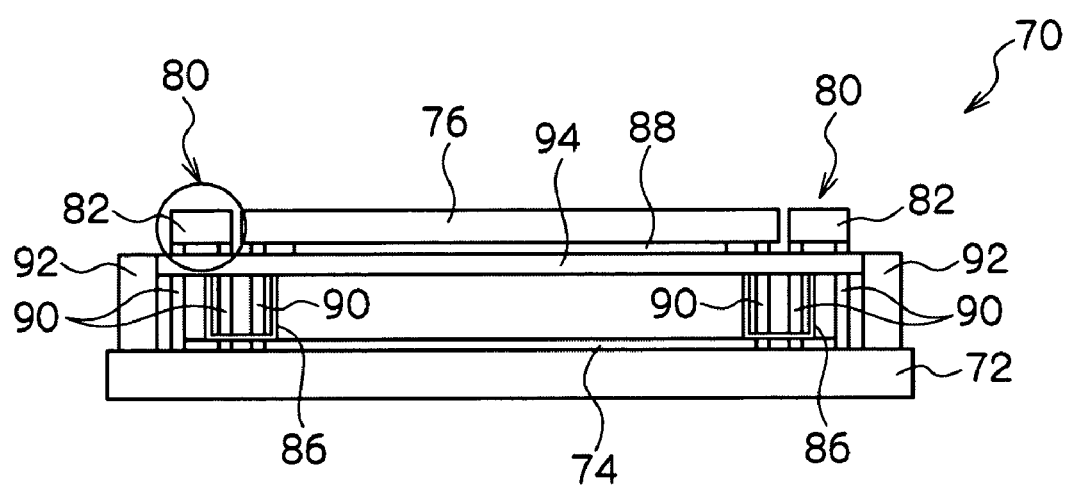
FIG. 21 is a side view of the variable capacitor shown in FIG. 20.
Figure 22:
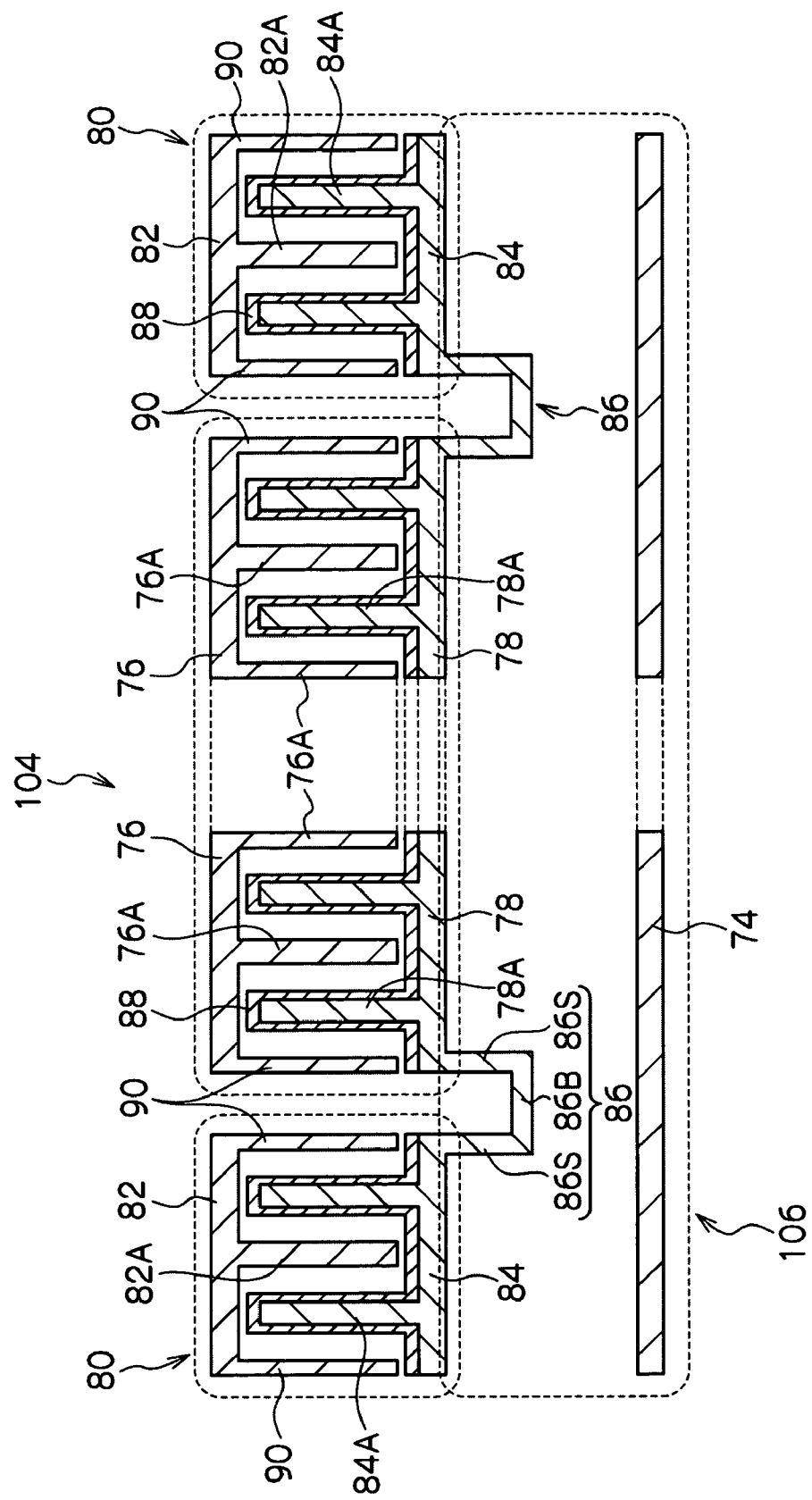
FIG. 22 is a cross-section of the variable capacitor shown in FIG. 20, taken on line Y-Y.

A brief explanation of a configuration of a variable capacitor according to the fifth exemplary embodiment will now be given, with reference to FIG. 20 to FIG. 22. FIG. 20 is a plan view of a variable capacitor according to the fifth exemplary embodiment of the present invention, as seen from the fixed electrode thereof. FIG. 21 is a side view of the variable capacitor shown in FIG. 20. FIG. 22 is a cross-section of the variable capacitor shown in FIG. 20, taken on line Y-Y.

A variable capacitor 70 is equipped with: a support substrate 72 configured from a semiconductor such as silicon or the like; a drive electrode 74 disposed on the support substrate 72; a fixed electrode 76 disposed so as to be separated from and facing the drive electrode 74; a movable electrode 78, disposed moveably retained between the drive electrode 74 and the fixed electrode 76; and plural brake capacitors 80, serving as a vibration prevention portion for preventing vibration after movement of the movable electrode 78.

In the present exemplary embodiment, two pairs of the brake capacitors 80 are provided, a total of four brake capacitors 80. One pair of the brake capacitors 80, at the top in the drawing, is disposed symmetrically on either side, left and right, of the fixed electrode 76, with the fixed electrode 76 therebetween. Each of the brake capacitors 80 is configured with an upper portion brake electrode 82 and a lower portion brake electrode 84 for making contact with the upper portion brake electrode 82.

The support substrate 72 is a flat plate of rectangular shape in plan view. The drive electrode 74 is a thin film electrode formed from an electrically-conductive material. The drive electrode 74 is formed as a film on the support substrate 72, with an insulating layer (not illustrated) interposed therebetween. The drive electrode 74 is of a rectangular shape in plan view slightly smaller than the support substrate 72, and is formed on the middle of the support substrate 72.

In the present exemplary embodiment the surface area of the support substrate 72 is set at 400 μm×400 μm and the surface area of the drive electrode 74 is set at 300 μm×300 μm. $WSi_2$ is employed for the electrically-conductive material used for the drive electrode 74. $Si_3N_4$ is employed for the insulating layer (not illustrated). The thickness of the drive electrode 74 is 0.2 μm.

The fixed electrode 76 is equipped with a substrate of rectangular shape in plan view. Plural comb teeth portions 76A are provided to the substrate, projecting out from the substrate toward the support substrate 72. The comb teeth portions 76A of the fixed electrode 76 are non-illustrated elongated shaped plate bodies, extending along the Y direction and provided so as to make a right angle with the substrate of the fixed electrode 76.

The upper portion brake electrodes 82 are each equipped with a substrate that is a narrow rectangular shape in plan view. The substrates of the upper portion brake electrodes 82 are disposed with their length direction aligned in the Y direction, and so that one of the length-direction side faces of the substrates of the upper portion brake electrodes 82 faces one of the side faces extending in the Y direction of the substrate of the fixed electrode 76. Namely, the upper portion brake electrodes 82 are configured as separate members from the fixed electrode 76.

The substrate of the upper portion brake electrodes 82 are provided with a single or plural comb teeth portions 82A that project out from the substrate toward the support substrate 72. The comb teeth portions 82A of the brake capacitors 80 are provided as long shaped plate bodies extending in the Y direction of the drawings and making a right angle with respect to the substrates of the upper portion brake electrodes 82.

The surface area of the fixed electrode 76 is about the same size as the surface area of the facing drive electrode 74. The fixed electrode 76 and the upper portion brake electrode 82 are formed from electrically-conductive materials. In the present exemplary embodiment, the surface area of the fixed electrode 76 is set at 300 μm×300 μm. Poly-Si is employed as the electrically-conductive materials used for the fixed electrode 76 and the upper portion brake electrode 82.

The movable electrode 78 is equipped with a substrate of rectangular shape in plan view. Plural comb teeth portions 78A are provided to the substrate projecting out toward the fixed electrode 76. The comb teeth portions 78A of the movable electrode 78 are provided as non-illustrated elongated shaped plate bodies extending in the Y direction, forming a right angle with respect to the substrate of the movable electrode 78.

The lower portion brake electrodes 84 are each equipped with a substrate that is narrow rectangular shaped in plan view. The substrate of the lower portion brake electrode 84 is provided so as to directly face the substrate of the respective upper portion brake electrode 82. Plural comb teeth portions 84A are provided to this substrate, projecting out toward the upper portion brake electrode 82. The comb teeth portions 84A of the lower portion brake electrode 84 are provided as elongated shaped plate bodies extending in the Y direction and making a right angle with respect to the substrate of the lower portion brake electrode 84.

The surface area of the movable electrode 78 is about the same size as the surface area of the facing fixed electrode 76. The movable electrode 78 and the lower portion brake electrode 84 are formed from electrically-conductive materials. In the present exemplary embodiment the surface area of the movable electrode 78 is set at 300 μm×300 μm. Poly-Si is employed as the electrically-conductive materials used for the movable electrode 78 and the lower portion brake electrode 84.

A pair of lower portion brake electrodes 84 is provided corresponding to each pair of brake capacitors 80. Each of the lower portion brake electrodes 84 are symmetrically connected to each side of the movable electrode 78 via flexible connection members 86. The flexible connection members 86 are each provided with a narrow rectangular shaped base portion 86B, and with two bar shaped side portions 86S that extend up from the two edges of the base portions 86B. The movable electrode 78 side will be referred to as the inside, and the lower portion brake electrode 84 side will be referred to as the outside. One end of the side portions 86S that are disposed at the outside is connected to the substrate of the respective lower portion brake electrode 84. One end of the side portions 86S that are disposed at the inside is connected to the substrate of the movable electrode 78.

Namely, the lower portion brake electrodes 84, the connection members 86 and the movable electrode 78 are integrally formed. However, respective lower portion brake electrodes 84 of each pair of lower portion brake electrodes 84 are symmetrically connected at the two sides of the movable electrodes 78, and move in opposite horizontal directions to each other, with the movable electrode 78 pulled in both directions thereby. As a result, the side portions 86S of the connection members 86 resiliently deform and bend, with the connection members 86 themselves not moving, and the movable electrode 78 not moving. Consequently, the lower portion brake electrodes 84 can be moved alone, without moving the movable electrode 78.

The surfaces of the movable electrode 78 and the lower portion brake electrode 84 that are formed with the comb teeth portions are covered by a dielectric layer 88. In the present exemplary embodiment $Si_3N_4$ is used for the dielectric layer 88.

The fixed electrode 76 is supported by plural support columns 90 provided extending upright from the support substrate 72, and the fixed electrode 76 is fixed so as to be disposed at a specific height from the support substrate 72. The upper portion brake electrodes 82 are also supported by the plural support columns 90 extending upright from the support substrate 72, and the upper portion brake electrodes 82 are also fixed so as to be disposed at substantially the same height as the fixed electrode 76. Three or more of the support columns 90 are preferably used for supporting each individual member. The plural support columns 90 are formed from an electrically-conductive material in the same manner as the fixed electrode 76 and the upper portion brake electrode 82. In the present exemplary embodiment Poly-Si is employed as the electrically-conductive materials used for the support columns 90.

Column shaped anchor portions 92 are provided extending upright from the respective four corners of the support substrate 72. Namely, four anchor portions 92 are provided extending up from the support substrate 72. Elongated shaped beam portions 94 span across between the four anchor portions 92. The elongated shaped beam portions 94 span across so as to surround the movable electrode 78 etc. In the present exemplary embodiment, the beam portions 94 are of 1.4 μm width and span across at a height of about 3.5 μm from the support substrate 72.

The movable electrode 78 is connected to the beam portions 94 by plural spring members 96. By connection to the beam portions 94 with the spring members 96, the movable electrode 78 is retained between the drive electrode 74 and the fixed electrode 76 so as to be able to move in the vertical direction and in the horizontal direction. In the present exemplary embodiment the lower portion brake electrodes 84 and the movable electrode 78 are retained at the same height as the elongated shaped beam portions 94 (a height of about 3.5 μm from the support substrate 72) by four of the spring members 96.

The anchor portions 92, the beam portions 94, and the spring members 96 are formed from electrically-conductive materials in a similar manner to the retained movable electrode 78. In the present exemplary embodiment, Poly-Si is employed as the electrically-conductive materials used for the anchor portions 92, the beam portions 94, and the spring members 96.

Figure 23:
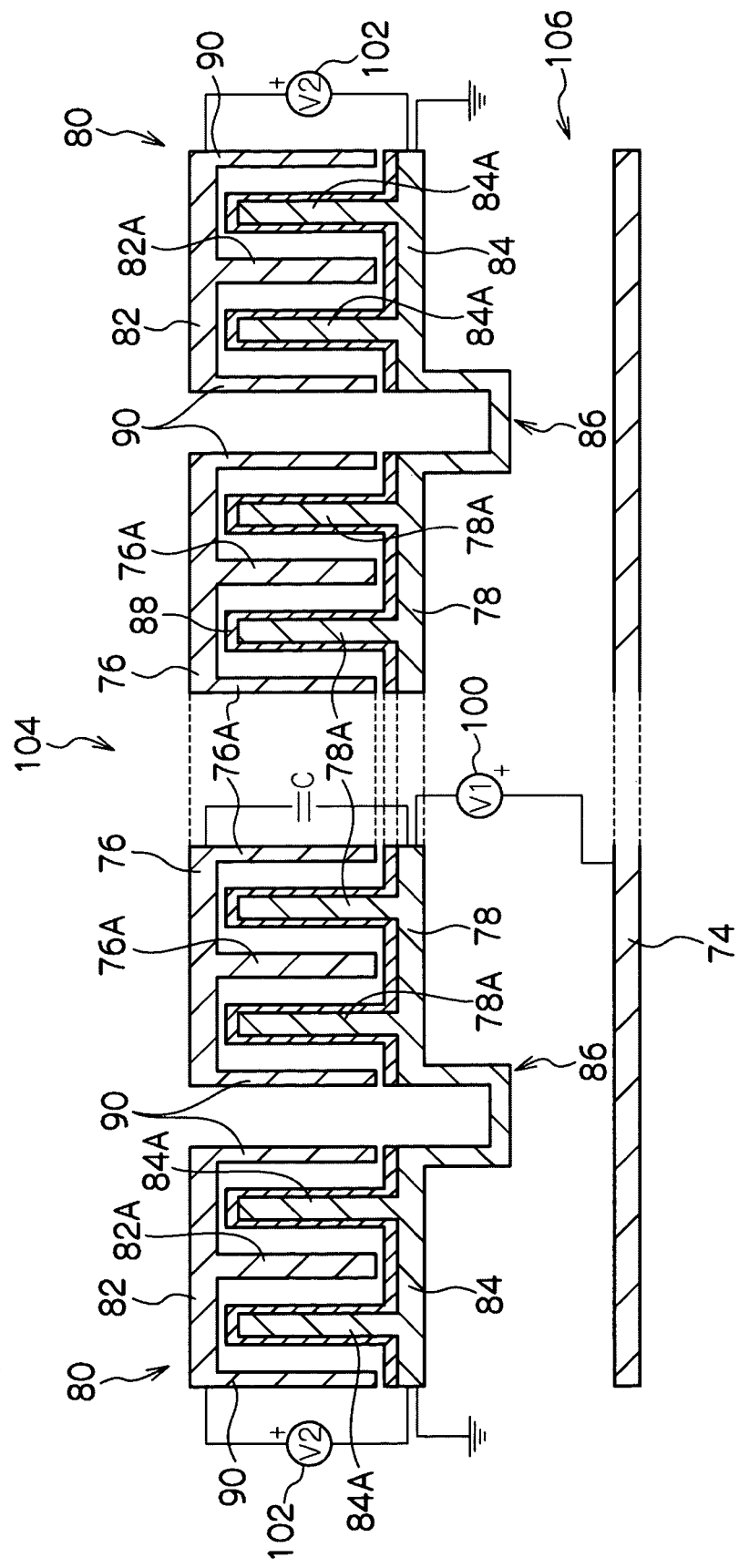
FIG. 23 is an diagram for explaining a capacitance adjusting operation of a variable capacitor.

As shown in FIG. 22 and FIG. 23, in the initial sate before application of voltage between the electrodes, the movable electrode 78, to which the lower portion brake electrodes 84 are attached, is retained at a specific position such that the comb teeth portions 78A and the comb teeth portions 84A of the movable electrode 78 side, each face toward spaces between the comb teeth portions 76A and the comb teeth portion 82A of the fixed electrode 76 side (regions thereof in which there are no comb teeth portions provided).

Due to this configuration, even if the movable electrode 78 moves in the vertical direction toward the fixed electrode 76, the comb teeth portions 78A of the movable electrode 78 can intrude into spaces between two adjacent comb teeth portions 76A on the fixed electrode 76 side (or into the space between the comb teeth portions 76A and the support columns 90). The comb teeth portions 84A of the lower portion brake electrodes 84 can also intrude into the spaces between two adjacent comb teeth portion 82A on the fixed electrode 76 side (or into the space between the comb teeth portions 82A and the support columns 90). In the present exemplary embodiment, for example, with the comb teeth portions 76A and the comb teeth portions 78A disposed such that the comb teeth portions of the facing electrodes are in the fitted together state, the distance between adjacent comb teeth portions is set to about 0.1 μm.

As described above, the surfaces of the movable electrode 78 and the lower portion brake electrodes 84 that are formed with the comb teeth portions, are covered by the dielectric layer 88. Consequently, the dielectric layer 88 is always present interposed between the movable electrode 78 and the fixed electrode 76, and no short circuiting occurs between the two electrodes due to movement of the movable electrode 78. In a similar manner, the dielectric layer 88 is always present interposed between the upper portion brake electrodes 82 and the lower portion brake electrodes 84, and so no short circuiting occurs between the respective two electrodes due to movement of the lower portion brake electrode 84.

The drive electrode 74 and the movable electrode 78 are connected to a power source 100 that applies a driving voltage V1 between the two electrodes. The upper portion brake electrodes 82 and the lower portion brake electrodes 84 are also connected to a power source 102 that applies a braking voltage V2 between the respective two electrodes. It should be noted that the lower portion brake electrodes 84 and the movable electrode 78 are connected to the power source 102 and are also earthed. Consequently, the lower portion brake electrodes 84 and the movable electrode 78 are earthed and are at a ground electrical potential.

The variable capacitor 70 is configured, from the functional perspective, by three types of capacitor: the brake capacitors 80 serving as vibration prevention portion; a tunable capacitor 104 serving as a variable capacitor; and a drive capacitor 106 serving as an electrode drive portion. Each of the brake capacitors 80 is configured by the upper portion brake electrode 82 and the lower portion brake electrode 84. The tunable capacitor 104 is configured by the fixed electrode 76 and the movable electrode 78. The drive capacitor 106 is configured from the drive electrode 74, and the movable electrode 78 and the lower portion brake electrode 84. The capacitance of the tunable capacitor 104 will be referred to as "C".

Operation of Variable Capacitor (1) Capacitance Adjusting Operation of the Variable Capacitor First explanation will be given of the capacitance adjusting operation of the variable capacitor, with reference to FIG. 23.

As shown in FIG. 23, to perform capacitance adjusting operation, a positive voltage of V1 is applied to the drive capacitor 106 with the braking voltage V2 at 0V. The driving voltage V1 is applied between the drive electrode 74 and the movable electrode 78 from the power source 100. The separation distance between the electrodes in the vertical direction of the drive capacitor 106 is thereby reduced, and the movable electrode 78 moves toward the drive electrode 74. The facing electrode surface area of the tunable capacitor 104 reduces, and the facing separation distance of the fixed electrode 76 and the movable electrode 78 increases. The capacitance C of the tunable capacitor 104 thereby becomes smaller.

(2) Vibration Prevention Operation of Variable Capacitor

Explanation will now be given of vibration prevention operation of the variable capacitor, with reference to FIG. 24.

As shown in FIG. 24, to execute vibration prevention operation, the braking voltage V2 is applied to the brake capacitors 80. The braking voltage V2 is applied between the upper portion brake electrodes 82 and the lower portion brake electrodes 84 from the power source 102. When the braking voltage V2 is applied, the lower portion brake electrodes 84 move outwards in a horizontal direction, with the inter electrode separation distance between the upper portion brake electrodes 82 and the lower portion brake electrodes 84 in the horizontal direction becoming 0 μm. Namely, both respective facing electrodes make contact with each other with the dielectric layer 88 interposed therebetween.

Two pairs of lower portion brake electrodes 84 are connected at the two sides of the movable electrode 78. Even if each of the lower portion brake electrodes 84 of a pair move in opposite directions in a horizontal direction, the side portions 86S at the outside of the connection members 86 resiliently deform and bend, and there is no movement of the connection members 86 themselves in the horizontal direction, and the movable electrode 78 does not move in the horizontal direction.

Namely, the lower portion brake electrodes 84 move in a horizontal direction, and by the upper portion brake electrodes 82 and the lower portion brake electrodes 84 making contact over a large surface area, the lower portion brake electrodes 84 can be stably maintained in a specific position in the vertical direction by frictional force between the electrodes. At the same time, each of the respective lower portion brake electrodes 84 in a pair move in opposite horizontal directions to each other, with pulling forces on the movable electrode 78 canceling themselves out so that the movable electrode 78 does not move, and the movable electrode 78 can be stably maintained in a specific position in the horizontal direction.

So as stated, during vibration prevention operation, even though each of the lower portion brake electrodes 84 moves in a respective horizontal direction, since there is no change in the facing separation distance between the fixed electrode 76 and the movable electrode 78 in the tunable capacitor 104, the capacitance C of the tunable capacitor 104 can be maintained constant.

Fabricating Processes of the Variable Capacitor

Explanation will now be given of a fabricating method of the variable capacitor according to the fifth exemplary embodiment, with reference to FIG. 25 and FIG. 26. An example of the fabricating processes is shown in relation to the left hand portion of the configuration shown in FIG. 22.

Figure 25A:
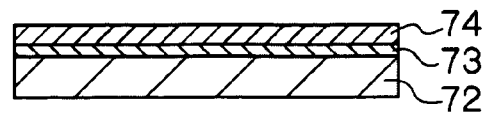
FIG. 25A to 25H are process diagrams for explaining a fabricating method of a variable capacitor according to the fifth exemplary embodiment.
Figure 25B:
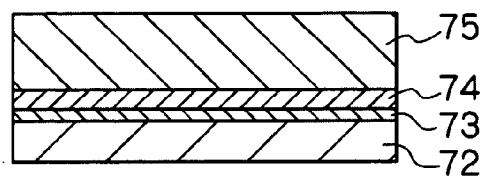

First, as shown in FIG. 25A, a $Si_3N_4$ insulating layer 73 is formed as a film at a thickness of 500 nm on the support substrate 72, which is a silicon substrate, for example using a known LP-CVD (Low Pressure CVD) method. A $WSi_2$ film is formed at a thickness of 200 nm on the $Si_3N_4$ insulating layer 73, for example using a known sputtering method or the like, forming a $WSi_2$ drive electrode 74. Next, as shown in FIG. 25B, a $SiO_2$ layer is deposited at a thickness of 1.1 μm on the $WSiO_2$ drive electrode 74, for example using a known LP-CVD method or the like, forming an $SiO_2$ sacrificial film 75.

Figure 25C:
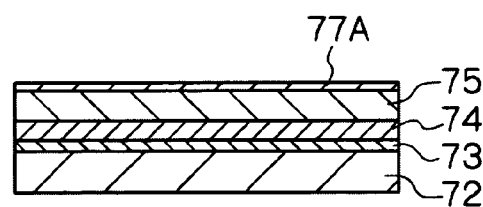

Next, as shown in FIG. 25C, in order to form the base portions 86B of the connection members 86 etc., a Poly-Si layer 77A is formed as a film at a thickness of 1.1 μm on the $SiO_2$ sacrificial film 75, for example using a known LP-CVD method or the like. The Poly-Si layer 77A is doped with phosphorous. To carry out doping $PH_3$ is introduced as an impurity gas at the same time and in addition to the raw material gas of $SiH_4$.

Figure 25D:
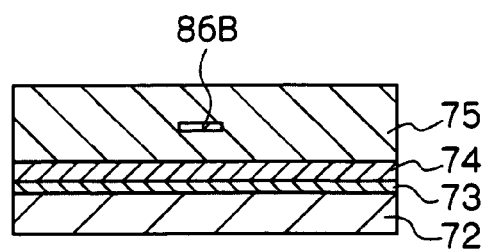

Next, as shown in FIG. 25D, patterning in narrow rectangular shapes is made to the Poly-Si layer 77A by a known method, for example with a combination of photolithography using a resist and dry etching or the like, forming base portions 86B of the connection members 86. Then, in order to form the side portions 86S of the connection members 86, the $SiO_2$ sacrificial film 75 is formed with a further thickness of 2.2 μm on the base portions 86B of the connection member 86 and the exposed $SiO_2$ sacrificial film 75.

Figure 25E:
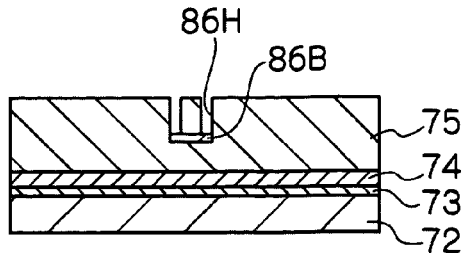

Then, as shown in FIG. 25E, the $SiO_2$ sacrificial film 75 is removed in a specific pattern using known methods, for example with a combination of photolithography using a resist and dry etching or the like, and two through holes 86H are formed through to the base portions 86B of the connection members 86.

Figure 25F:
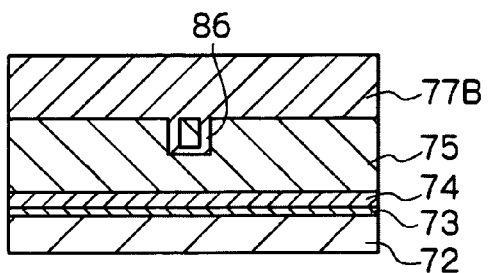

Next, as shown in FIG. 25F, in order to form the movable electrode 78 etc., a Poly-Si layer 77B is formed as a film at a thickness of 2.2 μm on the $SiO_2$ sacrificial film 75, for example using a known LP-CVD method or the like. The Poly-Si layer 77B is doped with phosphorous. The two individual through holes 86H are also filled in by the Poly-Si layer 77B, forming the side portions 86S of the connection members 86. The surface of the Poly-Si layer 77B is flattened down to a thickness of 1.4 μm, by employing a known method, for example such as CMP or the like.

Figure 25G:
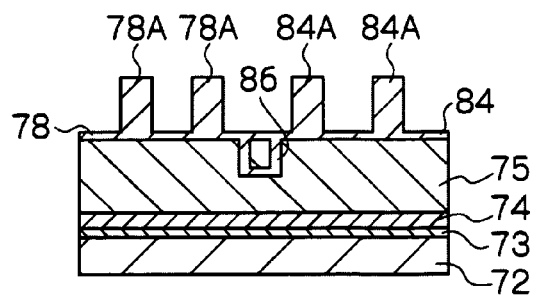

Next, as shown in FIG. 25G, patterning is made to the Poly-Si layer 77B by known methods, for example with a combination of photolithography using a resist and dry etching or the like, forming the movable electrode 78 (comb teeth portions 78A) and the lower portion brake electrodes 84 (comb teeth portions 84A). Etching in the etching process is to a depth of about 1.2 μm.

Figure 25H:
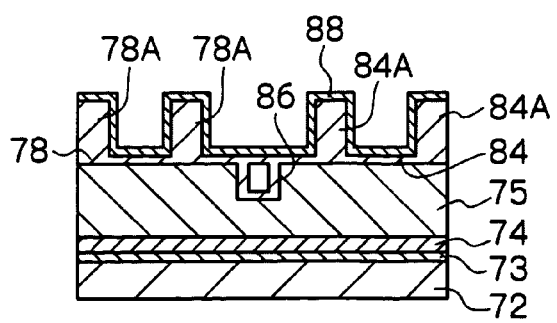

Next, as shown in FIG. 25H, a $Si_3N_4$ layer is formed as a film at a thickness of 0.1 μm over the surface of the movable electrode 78 and the lower portion brake electrode 84 that have been patterned in the Poly-Si layer 77B, for example by a known LP-CVD method or the like, forming the $Si_3N_4$ dielectric layer 88.

Figure 26I:
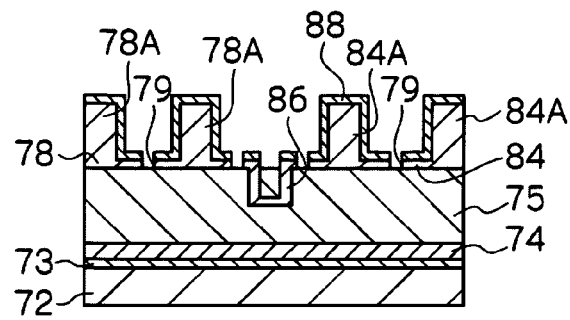
FIG. 26I to 26M are process diagrams for explaining a fabricating method of a variable capacitor according to the fifth exemplary embodiment.

Next, as shown in FIG. 26I, the Poly-Si layer (the movable electrode 78 and the lower portion brake electrodes 84) and in the $Si_3N_4$ dielectric layer 88 are removed in a specific pattern by known methods, for example with a combination of photolithography using a resist and dry etching or the like, exposing the $SiO_2$ sacrificial film 75, and forming release holes 79.

Figure 26J:
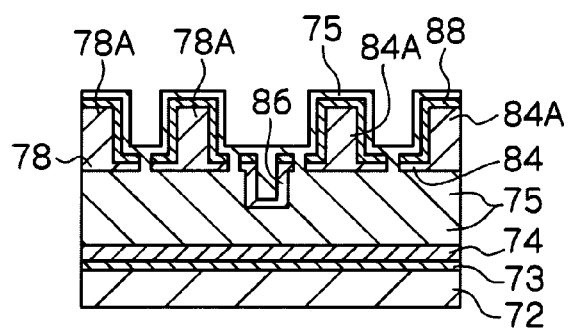

Next, as shown in FIG. 26J, the $SiO_2$ sacrificial film 75 is formed as a film at a further 0.1 μm thickness over the surfaces of the movable electrode 78 and the lower portion brake electrode 84 that are covered by the $Si_3N_4$ dielectric layer 88, for example by a known LP-CVD method or the like. The release holes 79 are also filled with the $SiO_2$ sacrificial film 75.

Figure 26K:
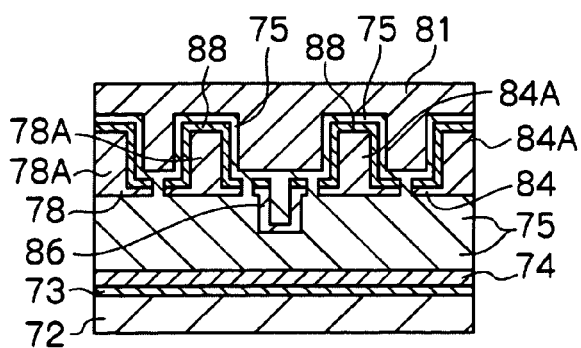
Figure 26L:
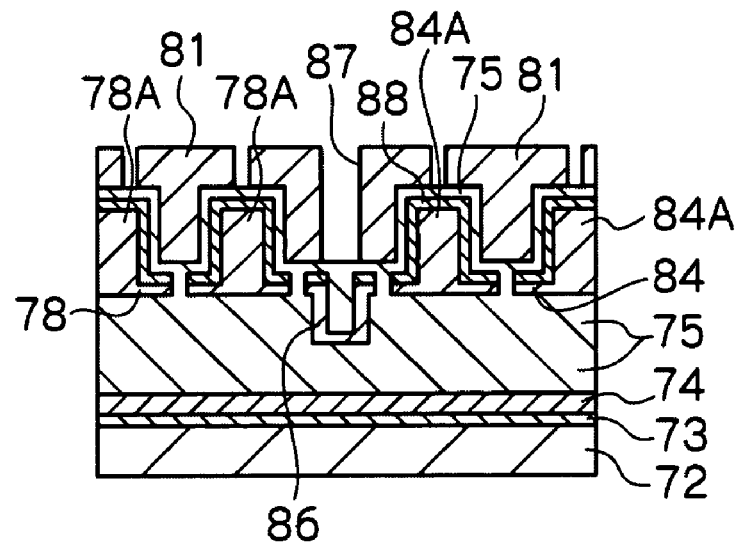

Next, as shown in FIG. 26K, in order to form the fixed electrode 76 etc., a Poly-Si layer 81 is deposited at a thickness of 1.4 μm, for example by a known LP-CVD method or the like. Next, as shown in FIG. 26L, etching is performed until the surface of the $SiO_2$ sacrificial film 75 is exposed, non-required portions of the Poly-Si layer 81 are remove in a specific pattern, and release holes 87 are formed for releasing the $SiO_2$ sacrificial film 75.

Figure 26M:
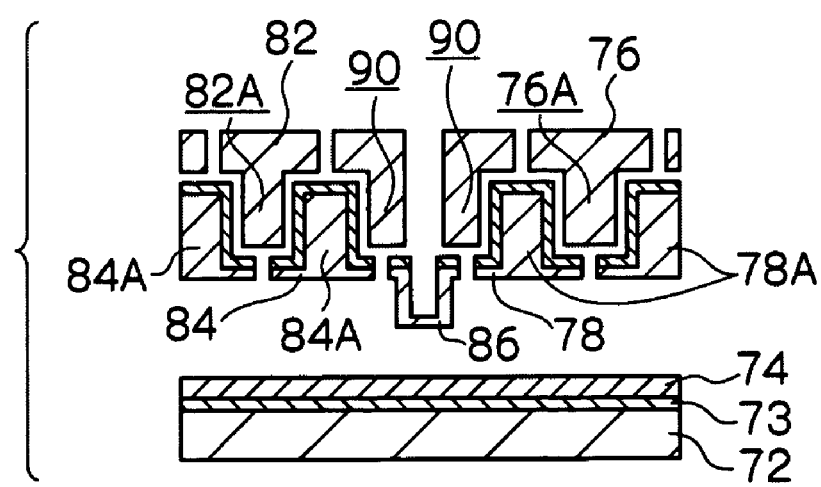

Finally, as shown in FIG. 26M, in order to form the fixed electrode 76 (comb teeth portions 76A) and the upper portion brake electrode 82 (comb teeth portion 82A), the $SiO_2$ sacrificial film 75 is released using a known method. Removal is, for example, by wet etching in which hydrofluoric acid is permeated into the $SiO_2$ sacrificial film 75. By using these processes, the movable electrode 78 and the lower portion brake electrode 84 are parted from the fixed electrode 76 and the upper portion brake electrode 82, and also from the drive electrode 74, so as to be able to move freely. The connection members 86 are also formed connecting the movable electrode 78 and the lower portion brake electrodes 84.

As described above, in the variable capacitor of the present exemplary embodiment, when a driving voltage V1 is applied to the drive capacitor with the braking voltage V2 at 0V, the movable electrode moves toward the drive electrode, changing the capacitance C of the tunable capacitor. When, in this state, a braking voltage V2 is also applied to the brake capacitor, the lower portion brake electrodes move in a horizontal direction, and the comb teeth portions of the upper portion brake electrodes and the comb teeth portions of the lower portion brake electrodes make contact with each other, with the dielectric layer disposed therebetween, fixing the position of the lower portion brake electrode in the vertical direction by frictional force.

Each of the respective lower portion brake electrodes in a pair are connected symmetrically to each of the two sides of the movable electrode, and the lower portion brake electrodes move in opposite horizontal directions to each other, so that the moveable electrode is pulled in both directions. As a result, the side portions at the outside of the connection members deform resiliently and bend, and there is no movement of the moveable electrode in either a horizontal or vertical direction. Vibration of the moveable electrode due to external vibration is thereby prevented.

Since the facing separation distance of the fixed electrode and the moveable electrode also does not change due to application of the braking voltage V2, the tunable capacitor can be even more stably operated at the desired capacitance C.

Sixth Exemplary Embodiment

Figure 27:
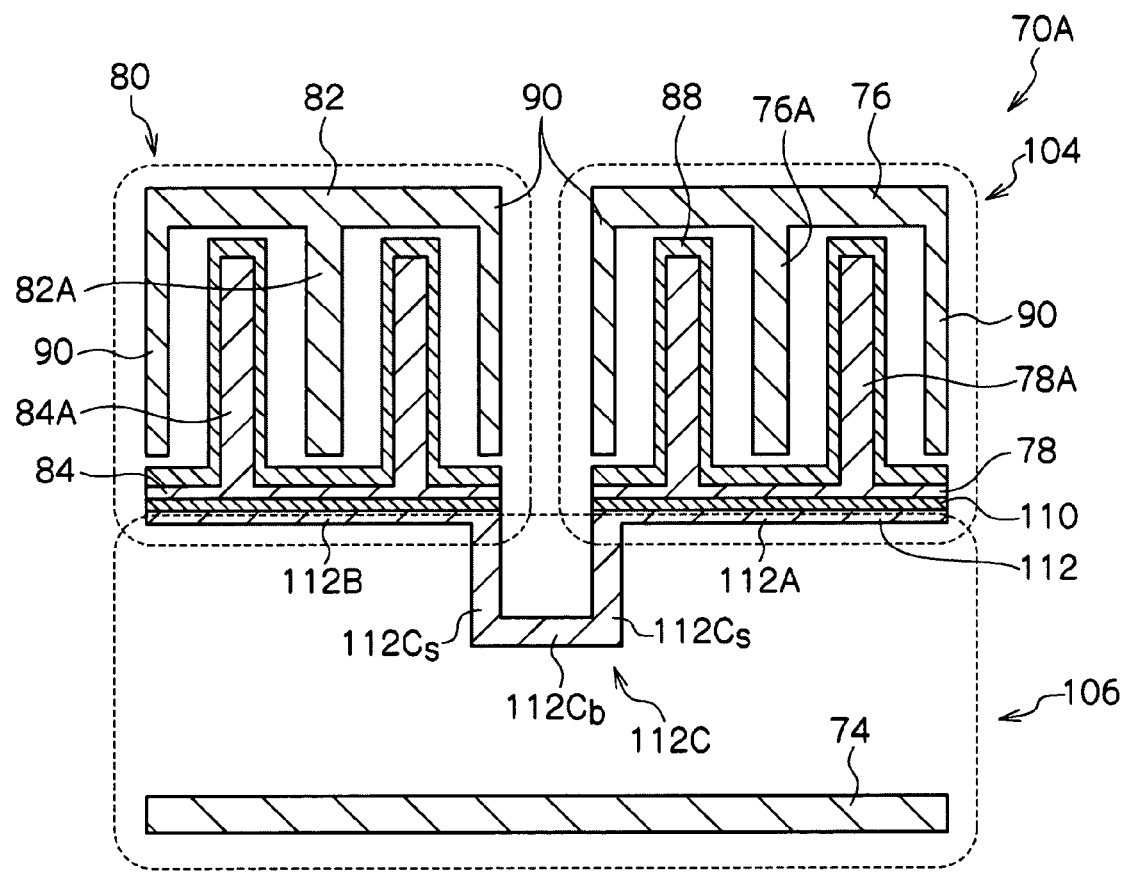
FIG. 27 is an enlarged diagram of portions of a variable capacitor according to a sixth exemplary embodiment of the present invention.

FIG. 27 is an enlarged diagram of portions of a variable capacitor according to a sixth exemplary embodiment of the present invention. FIG. 27 is a diagram corresponding to FIG. 14A of the second exemplary embodiment. A variable capacitor 70A according to the sixth exemplary embodiment is of similar configuration to that of the fifth exemplary embodiment, except in that: a movable drive electrode 112 is formed on the rear face of the lower portion brake electrode 84 and the movable electrode 78, with an insulating layer 110 interposed therebetween. Therefore similar portions will be allocated the same reference numerals and explanation thereof will be omitted.

In this case, the movable drive electrode 112 is configured integrally formed from a fixed portion 112A facing toward the movable electrode 78, movable portions 112B that face the lower portion brake electrodes 84, and connection portions 112C that connect the fixed portion 112A and the movable portions 112B. Each of pairs of the movable portions 112B that correspond to pairs of the brake capacitors 80 are connected symmetrically at the two sides of the fixed portion 112A by the connection portions 112C.

The connection portions 112C are each configured with a narrow rectangular shaped bottom portion 112Cb, and bar shaped side portions 112Cs that extend upright from the two edges of the base portion 112Cb. One end of the side portions 112Cs that are disposed at the outside is connected to the movable portion 112B and one end of the side portions 112Cs that are disposed at the inside is connected to the fixed portion 112A. Each of the movable portions 112B of a pair is connected symmetrically at the two sides of the fixed portion 112A, and since each moves in an opposite horizontal direction, the fixed portion 112A is pulled in both directions.

As a result, the side portions 112Cs at the outside of the connection portion 112C resiliently deform and bend, with the connection portion 112C themselves not moving, and the fixed portion 112A not moving. Consequently, in a similar manner to in the fifth exemplary embodiment, the lower portion brake electrode 84 can be moved alone, without moving the movable electrode 78.

Figure 28A:
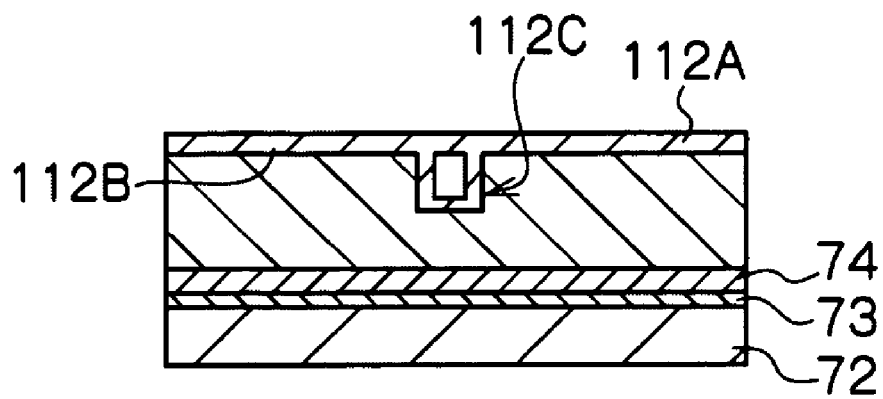
FIG. 28A is a process diagram for explaining a fabricating method of a variable capacitor according to the sixth exemplary embodiment.

The variable capacitor 70A according to the sixth exemplary embodiment as shown in FIG. 27 can be fabricated by similar fabricating processes to those of the fifth exemplary embodiment, except for in the processes explained below. In place of the process exemplified in the fifth exemplary embodiment shown in FIG. 25F, a Poly-Si layer is formed as a film at a thickness of 50 nm on the $SiO_2$ sacrificial film 75, using a known LP-CVD method or the like, as shown in FIG. 28A, forming the Poly-Si movable drive electrode 112 (112A, 112B, 112C).

Figure 28B:
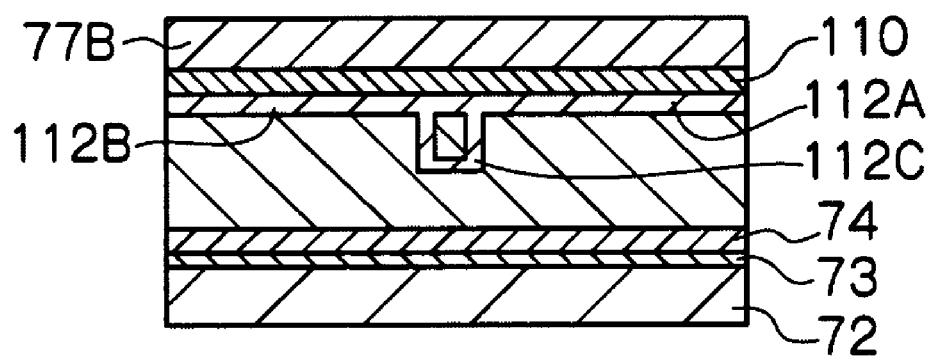
FIG. 28B is a process diagram for explaining a fabricating method of a variable capacitor according to the sixth exemplary embodiment.

Next, as shown in FIG. 28B, a $Si_3N_4$ film is formed at a thickness of 0.1 μm on the movable drive electrode 112, using a known LP-CVD method or the like, forming the $Si_3N_4$ insulating layer 110. In order to form the movable electrode 78 etc., a Poly-Si layer 77B is formed as a film at a thickness of 1.05 μm on the Si$_3$N$_4$ insulating layer 110 using, for example, a known LP-CVD method or the like. The Poly-Si layer 77B is doped with phosphorous (P).

Figure 29:
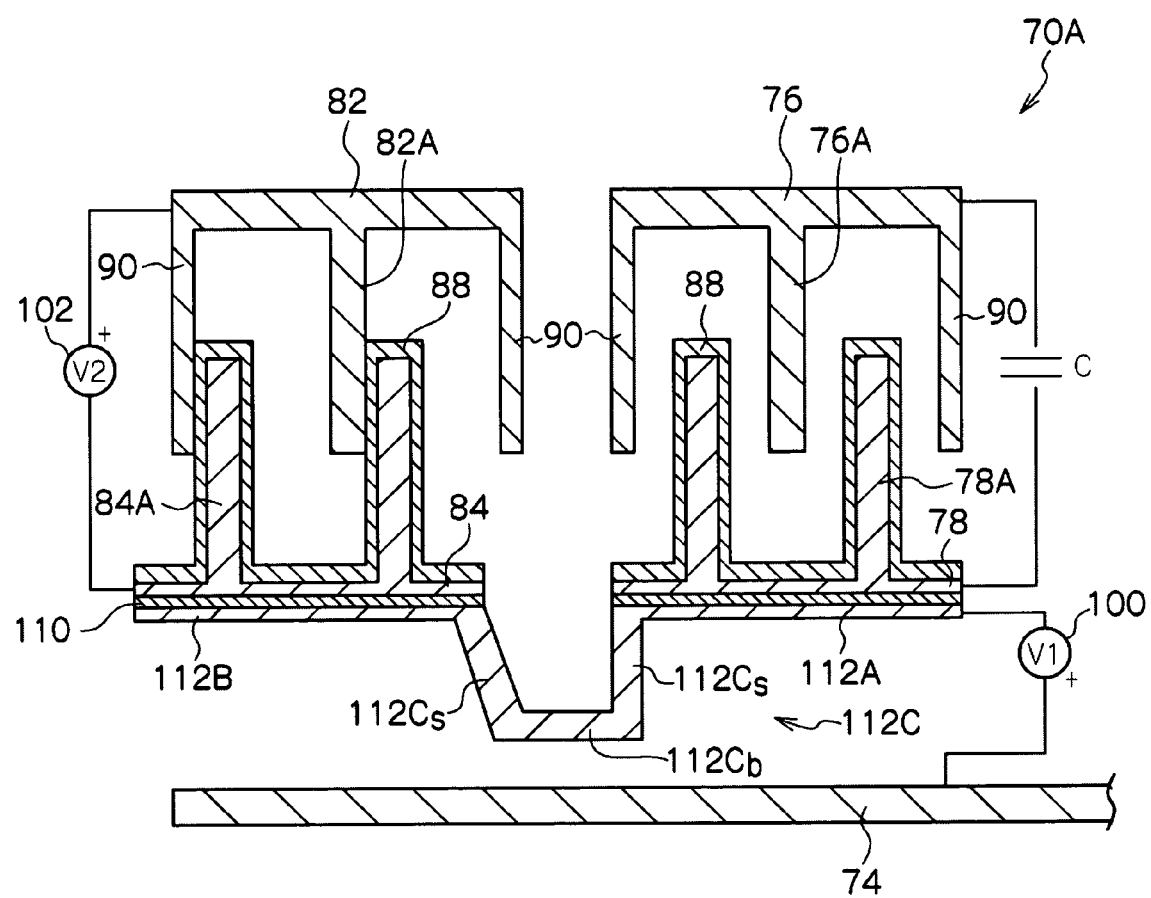
FIG. 29 is a diagram for explaining a vibration prevention operation in a variable capacitor.

FIG. 29 is a diagram for explaining the vibration prevention operation of the variable capacitor 70A.

As shown in FIG. 29, when a positive voltage V1 is applied to a drive capacitor 106 with the braking voltage V2 at 0V, the movable electrode 78 moves toward the drive electrode 74. However, there is a concern that the movable electrode 78 might vibrate when imparted with external vibration if the movable electrode 78 were to remain in the moved state toward the drive electrode 74 by electrostatic force. In order to prevent vibration, the braking voltage V2 is applied to the brake capacitors 80. The braking voltage V2 from a power source 102 is applied between the upper portion brake electrodes 82 and the lower portion brake electrodes 84.

When the braking voltage V2 is applied, the lower portion brake electrodes 84 move in a horizontal direction, with the inter electrode separation distance of the respective upper portion brake electrodes 82 and the lower portion brake electrodes 84 in the horizontal direction becoming 0 μm. Namely, both electrodes make contact with each other with the dielectric layer 88 interposed therebetween. The lower portion brake electrodes 84 and the movable electrode 78 are thereby fixed in position in the vertical direction.

However, at the two sides of the movable electrode 78 there are two sets of pairs of lower portion brake electrodes 84 connected together, through the interposed insulating layer 110 and the movable drive electrodes 112. Even if each of the lower portion brake electrodes 84 of a pair move in opposite directions in a horizontal direction, the side portions 112Cs at the outside of the connection portions 112C of the movable drive electrodes 112 resiliently deform and bend, there is no movement of the connection portions 112C themselves in the horizontal direction, and the movable electrode 78 does not move in the horizontal direction.

Namely, the lower portion brake electrodes 84 move in a horizontal direction, and by the upper portion brake electrodes 82 and the lower portion brake electrodes 84 making contact over a large surface area, the lower portion brake electrodes 84 can be stably maintained in a specific position in the vertical direction by frictional force between the electrodes. At the same time, the respective lower portion brake electrodes 84 in a pair move in opposite horizontal directions to each other, with pulling forces on the movable electrode 78 canceling themselves out so that the movable electrode 78 does not move, and the movable electrode 78 can be stably maintained in a specific position in the horizontal direction.

So as stated, during vibration prevention operation, even though each of the lower portion brake electrodes 84 moves in a respective horizontal direction, since there is no change in the facing separation distance between the fixed electrode 76 and the movable electrode 78 in the tunable capacitor 104, the capacitance C of the tunable capacitor 104 can be maintained constant.

As described above, in the variable capacitor of the present exemplary embodiment, when a driving voltage V1 is applied to the drive capacitor with the braking voltage V2 at 0V, the movable electrode moves toward the drive electrode, changing the capacitance C of the tunable capacitor. When, in this state, a braking voltage V2 is also applied to the brake capacitor, lower portion brake electrodes move in horizontal directions, the comb teeth portions of the upper portion brake electrodes and the comb teeth portions of the lower portion brake electrodes make contact with each other, with the dielectric layer disposed therebetween, fixing the position of the lower portion brake electrodes in the vertical direction by frictional force.

Each of the lower portion brake electrodes in a pair are connected symmetrically at the two sides of the moveable electrode, and since the respective lower portion brake electrode move in opposite horizontal directions to each other, the moveable electrode is pulled in both directions. As a result, side portions at the outside of the connection members are resiliently deformed and bend, without movement of the moveable electrode in either a horizontal or a vertical direction. Vibration of the moveable electrode due to external vibration is thereby prevented.

Since the facing separation distance between the fixed electrode and the moveable electrode is also not changed due to application of the braking voltage V2, the tunable capacitor can be even more stably operated at the desired capacitance C.

Also, in a similar manner to in the second exemplary embodiment, since the variable capacitor is configured with the movable drive electrode formed to the rear face of the lower portion brake electrodes and moveable electrode, with the insulating layer interposed therebetween, the moveable electrodes of the drive capacitor can be insulated from the moveable electrodes of the tunable capacitor by the insulating layer. Influence from the driving voltage V1 can thereby be reduced during tunable capacitor operation.

Figure 30:
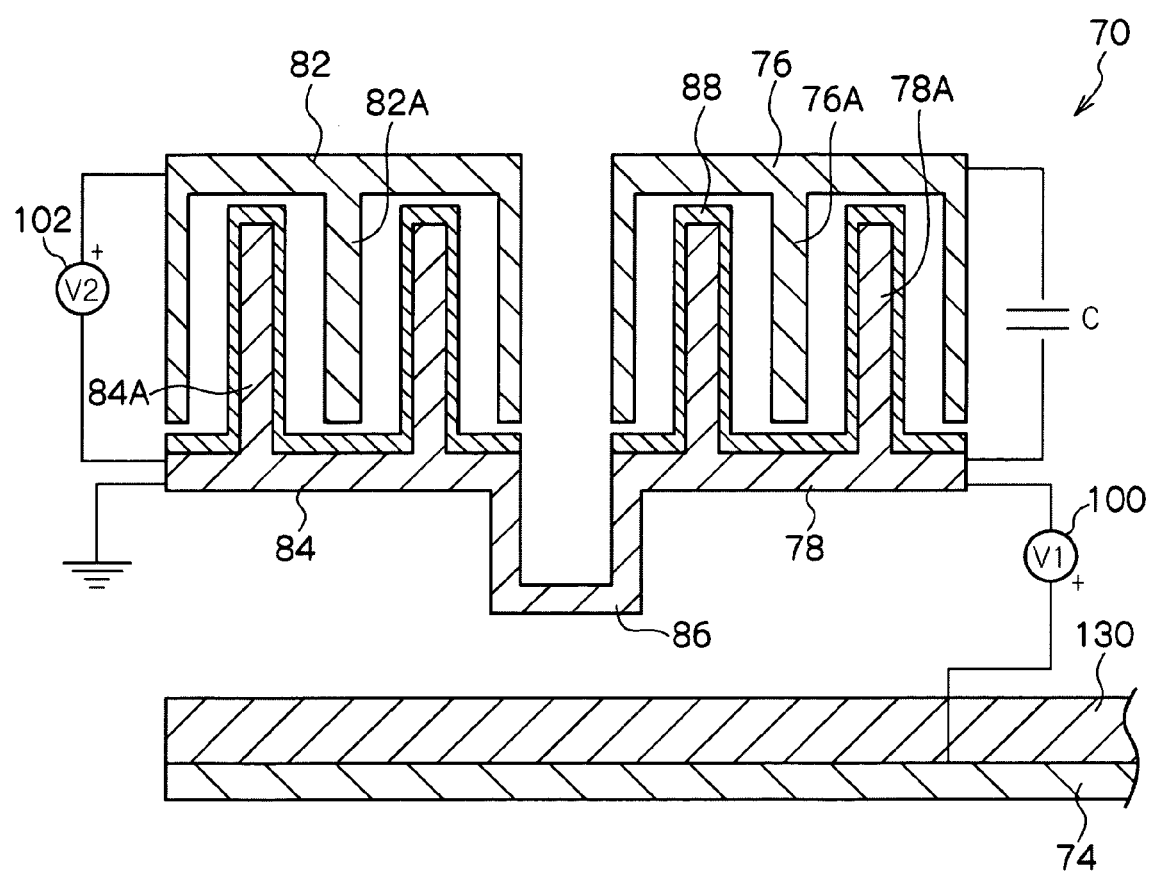
FIG. 30 is a diagram of an exemplary modification to the fifth exemplary embodiment.
Figure 31:
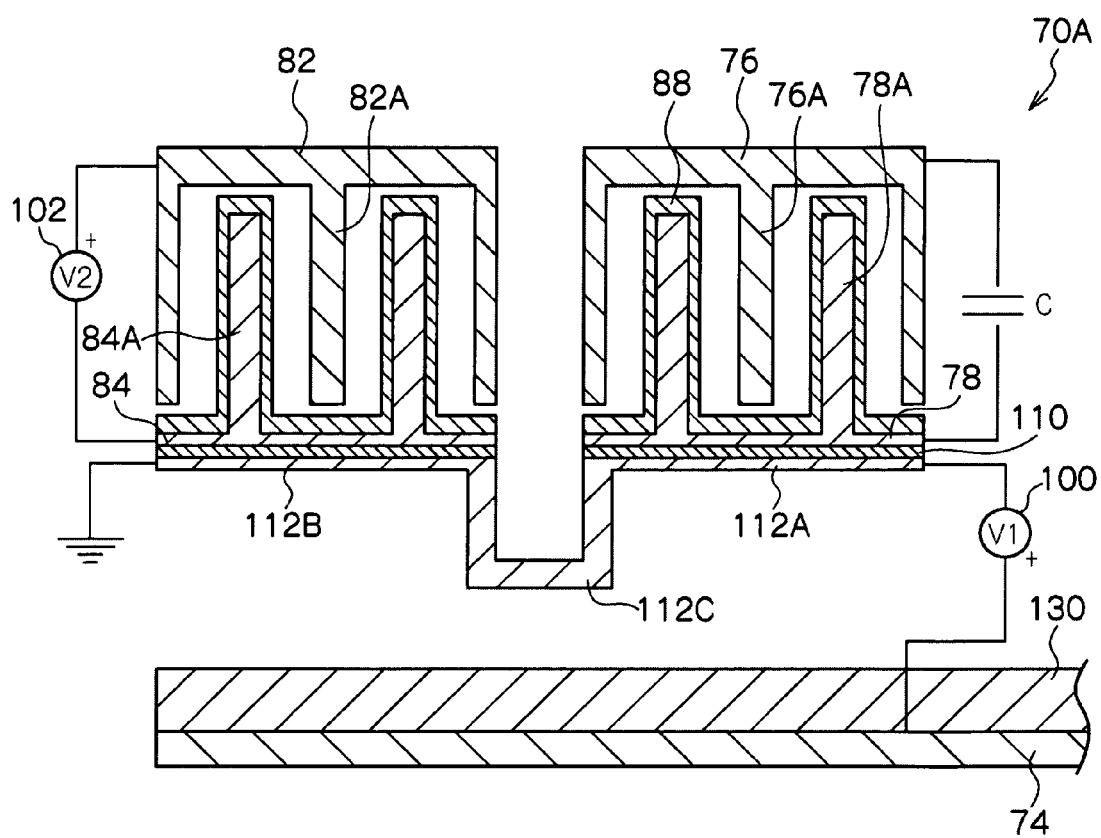
FIG. 31 is a diagram of an exemplary modification to the sixth exemplary embodiment.

In the fifth and sixth exemplary embodiments, in a similar manner to in the third exemplary embodiment, a dielectric layer may be provided on the support substrate so as to cover the drive electrode. For example, FIG. 30 is a diagram in which a dielectric layer 130 has been provided on the support substrate 72 of the variable capacitor 70 according to the fifth exemplary embodiment so as to cover the drive electrode 74, and FIG. 31 is a diagram in which a dielectric layer 130 has been provided on the support substrate 72 of the variable capacitor 70A according to the sixth exemplary embodiment so as to cover the drive electrode 74. Since configuration is similar to that of the fifth or the sixth exemplary embodiments, except for the provision of the dielectric layer 130, similar parts of the configuration are allocated the same reference numerals and explanation thereof is omitted.

According to such configurations, since the dielectric layer is introduced between the electrodes of the drive capacitor, the variable amount in the drive capacitor becomes extremely large. The spring constant of the drive capacitor is the sum of the mechanical spring constant of the beam portions and the electrical spring constant. Since the electrical spring constant also becomes large with the increase in the capacitance of the drive capacitor, the spring constant of the drive capacitor can be adjusted utilizing this effect by controlling the electrical spring constant by changing the thickness of the dielectric layer.

Thus, the breadth and scope of the present invention should not be limited by any of the above-described exemplary embodiments, but should be defined only in accordance with the following claims and their equivalents.

What is claimed is:

1. A variable capacitor comprising:
   a support substrate;
   a first electrode formed as a thin film on a surface of the support substrate;
   a flat plate shaped second electrode provided in a fixed position above the first electrode and provided with a plurality of comb teeth portions projecting out toward the first electrode;
   a flat plate shaped third electrode disposed between the first electrode and the second electrode, the third electrode retained so as to be movable with respect to the second electrode in a vertical direction and a horizontal direction, provided with a plurality of comb teeth portions facing toward spaces between the plurality of comb teeth portions of the second electrode and projecting out toward the second electrode, with the surface of the third electrode covered in a dielectric layer, wherein a variable capacitor is configured by the third electrode and the second electrode, and the third electrode moves in a vertical direction according to a first voltage applied between the first electrode and the second electrode;

a flat plate shaped fourth electrode disposed in a fixed position above the first electrode, the fourth electrode being connected in the horizontal direction to the second electrode, provided with a plurality of comb teeth portions projecting out toward the first electrode, and being electrically insulated from the second electrode;

a flat plate shaped fifth electrode disposed between the first electrode and the fourth electrode, the fifth electrode being connected in a horizontal direction to the third electrode and provided with at least one comb tooth portion facing toward a space between the plurality of comb teeth portions of the fourth electrode and projecting out toward the fourth electrode, the surface of the fifth electrode being covered in a dielectric layer, the fifth electrode configuring with the fourth electrode a vibration prevention portion that prevents vibration of the third electrode, the fifth electrode moving in a horizontal direction according to a second voltage applied between the fourth electrode and the fifth electrode with the comb teeth portions of the fourth electrode and the comb teeth portion(s) of the fifth electrode making contact and fixing the fifth electrode to the fourth electrode due to frictional force.

2. The variable capacitor of claim 1, further comprising a sixth electrode formed to surfaces of the third electrode and the fifth electrode that face toward the first electrode, with an insulating film interposed between the sixth electrode, and the third and fifth electrodes, wherein the third electrode moves in a vertical direction according to a first voltage applied between the sixth electrode and the first electrode.

3. The variable capacitor of claim 1, further comprising a dielectric layer provided between the first electrode and the third and fifth electrodes for adjusting the electrostatic capacitance between the electrodes.

4. The variable capacitor of claim 1, wherein the second electrode and the fourth electrode are formed as a single flat plate.

5. The variable capacitor of claim 1, wherein the support substrate is a semiconductor substrate or a crystalline substrate.

6. The variable capacitor of claim 1, wherein the support substrate is a silicon substrate or an aluminum oxide substrate.

7. A variable capacitor comprising:
a support substrate;
a first electrode formed as a thin film on a surface of the support substrate;
a flat plate shaped second electrode provided in a fixed position above the first electrode and provided with a plurality of comb teeth portions projecting out toward the first electrode;

a flat plate shaped third electrode disposed between the first electrode and the second electrode, the third electrode retained so as to be movable with respect to the second electrode in a vertical direction and a horizontal direction, provided with a plurality of comb teeth portions facing toward spaces between the plurality of comb teeth portions of the second electrode and projecting out toward the second electrode, with the surface of the third electrode covered in a dielectric layer, wherein a variable capacitor is configured by the third electrode and the second electrode, and the third electrode moves in a vertical direction according to a first voltage applied between the first electrode and the second electrode;

a plurality of pairs of flat plate shaped fourth electrodes disposed in a fixed position above the first electrode, connected in the horizontal direction to the second electrode so as to be left-right symmetrical with respect to the second electrode, provided with a plurality of comb teeth portions projecting out toward the first electrode, and electrically insulated from the second electrode;

a plurality of flat plate shaped fifth electrodes, provided so as to correspond to each of the plurality of pairs of fourth electrodes, disposed between the first electrode and the fourth electrodes, connected to the third electrode in a horizontal direction, and each provided with at least one comb tooth portion facing toward a space between the plurality of comb teeth portions of the respective fourth electrode and projecting out toward the fourth electrode, the surface of the fifth electrodes covered in a dielectric layer, the fifth electrodes configuring with each of the respective plurality of pairs of fourth a vibration prevention portion that prevents vibration of the third electrode, each of the respective fifth electrodes in a pair moving in opposite horizontal directions according to a second voltage applied between the fourth electrodes and the fifth electrodes, with the comb teeth portions of the fourth electrodes and the comb teeth portions of the fifth electrodes making contact and fixing the fifth electrodes to the respective of the plurality of pairs of fourth electrodes due to frictional force.

8. The variable capacitor of claim 7, further comprising a sixth electrode formed to surfaces of the third electrode and the plurality of pairs of fifth electrodes that face toward the first electrode, with an insulating film interposed between the sixth electrode and the third and fifth electrodes, wherein the third electrode moves in a vertical direction according to a first voltage applied between the sixth electrode and the first electrode.

9. The variable capacitor of claim 7, further comprising a dielectric layer provided between the first electrode and the third and fifth electrodes for adjusting the electrostatic capacitance between the electrodes.

10. The variable capacitor of claim 7, wherein the second electrode and the plurality of pairs of fourth electrodes are each formed as separate flat plates.

11. The variable capacitor of claim 7, wherein the third electrode and each of the plurality of pairs of fifth electrodes are connected by a U-shaped connecting member formed from a flexible material.

* * * * *